(12) United States Patent
Gladwin et al.

(10) Patent No.: US 8,458,233 B2
(45) Date of Patent: *Jun. 4, 2013

(54) DATA DE-DUPLICATION IN A DISPERSED STORAGE NETWORK UTILIZING DATA CHARACTERIZATION

(75) Inventors: S. Christopher Gladwin, Chicago, IL (US); Kumar Abhijeet, Chicago, IL (US); Greg Dhuse, Chicago, IL (US); Jason K. Resch, Chicago, IL (US); Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 148 days.

This patent is subject to a terminal disclaimer.

(21) Appl. No.: 12/885,244

(22) Filed: Sep. 17, 2010

(65) Prior Publication Data
US 2011/0125771 A1    May 26, 2011

Related U.S. Application Data

(60) Provisional application No. 61/264,534, filed on Nov. 25, 2009.

(51) Int. Cl.
*G06F 7/00* (2006.01)
*G06F 17/30* (2006.01)

(52) U.S. Cl.
USPC ............ 707/812; 707/827; 707/959; 709/219

(58) Field of Classification Search
USPC .................. 707/758, 812, 827, 959; 709/219
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Phong Nguyen
(74) *Attorney, Agent, or Firm* — Garlick & Markison; Timothy W. Markison

(57) ABSTRACT

A method begins with a processing module receiving, from a requesting device, a data storage request that includes data for storage. The method continues with the processing module determining whether substantially identical data is currently stored in a dispersed storage network (DSN) memory. The method continues with the processing module encoding at least a portion of the data using an error coding dispersal storage function to produce a set of encoded data slices, sending the set of encoded data slices to the DSN memory for storage therein, and generating a unique retrieval matrix for the requesting device, wherein the unique retrieval matrix identifies a sub-set of encoded data slices of the set of encoded data slices for subsequent retrieval of the at least a portion of the data, when the substantially identical data is not stored in the DSN memory.

16 Claims, 14 Drawing Sheets

U.S. PATENT DOCUMENTS

| | | | |
|---|---|---|---|
| 6,012,159 A * | 1/2000 | Fischer et al. | 714/755 |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,860,843 B2 * | 12/2010 | Dodd et al. | 707/693 |
| 7,966,495 B2 * | 6/2011 | Ackerman et al. | 713/180 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 * | 5/2003 | Shu | 707/1 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2005/0283566 A1 * | 12/2005 | Callaghan | 711/104 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2006/0259587 A1 * | 11/2006 | Ackerman et al. | 709/219 |
| 2006/0265436 A1 | 11/2006 | Edmond et al. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 * | 7/2007 | Gladwin et al. | 705/40 |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0034268 A1 * | 2/2008 | Dodd et al. | 714/755 |
| 2008/0183975 A1 * | 7/2008 | Foster et al. | 711/153 |
| 2009/0094251 A1 | 4/2009 | Gladwin et al. | |
| 2009/0094318 A1 | 4/2009 | Gladwin et al. | |
| 2009/0216910 A1 | 8/2009 | Duchesneau | |
| 2010/0023524 A1 | 1/2010 | Gladwin et al. | |
| 2011/0107184 A1 * | 5/2011 | Grube et al. | 714/768 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

International Search Report dated Jan. 21, 2011, 12 pages.

\* cited by examiner computing system 10

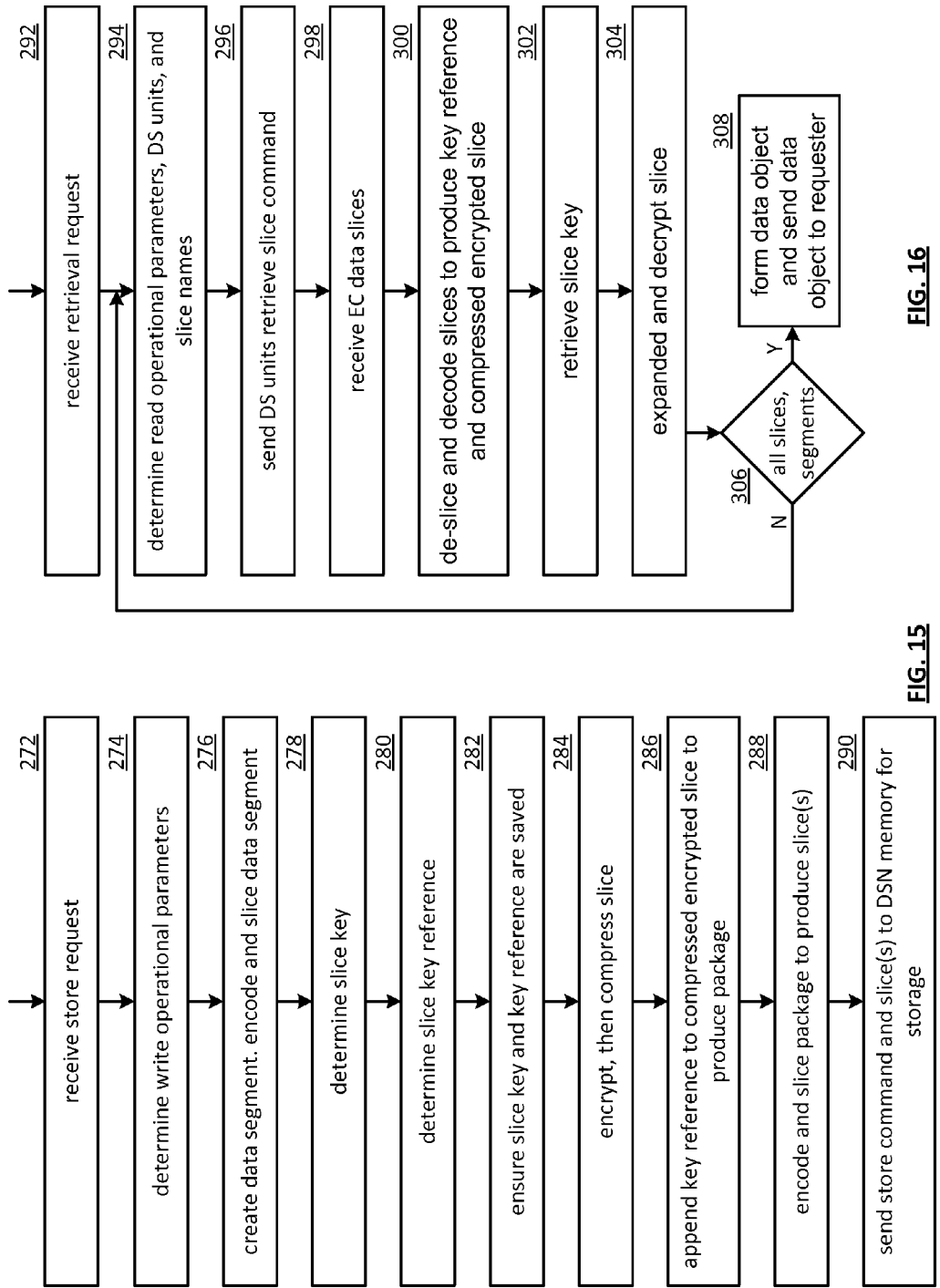

DATA DE-DUPLICATION IN A DISPERSED STORAGE NETWORK UTILIZING DATA CHARACTERIZATION

CROSS REFERENCE TO RELATED PATENTS

The present U.S. Utility patent application claims priority pursuant to 35 U.S.C. §119(e) to U.S. Provisional Application Ser. No. 61/264,534, entitled "DISTRIBUTED STORAGE DE-DUPLICATION," filed Nov. 25, 2009, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 15 is another flowchart illustrating another example of storing a data object in accordance with the invention;

FIG. 16 is another flowchart illustrating another example of retrieving a data object in accordance with the invention.

DETAILED DESCRIPTION OF THE INVENTION

Figure 1:
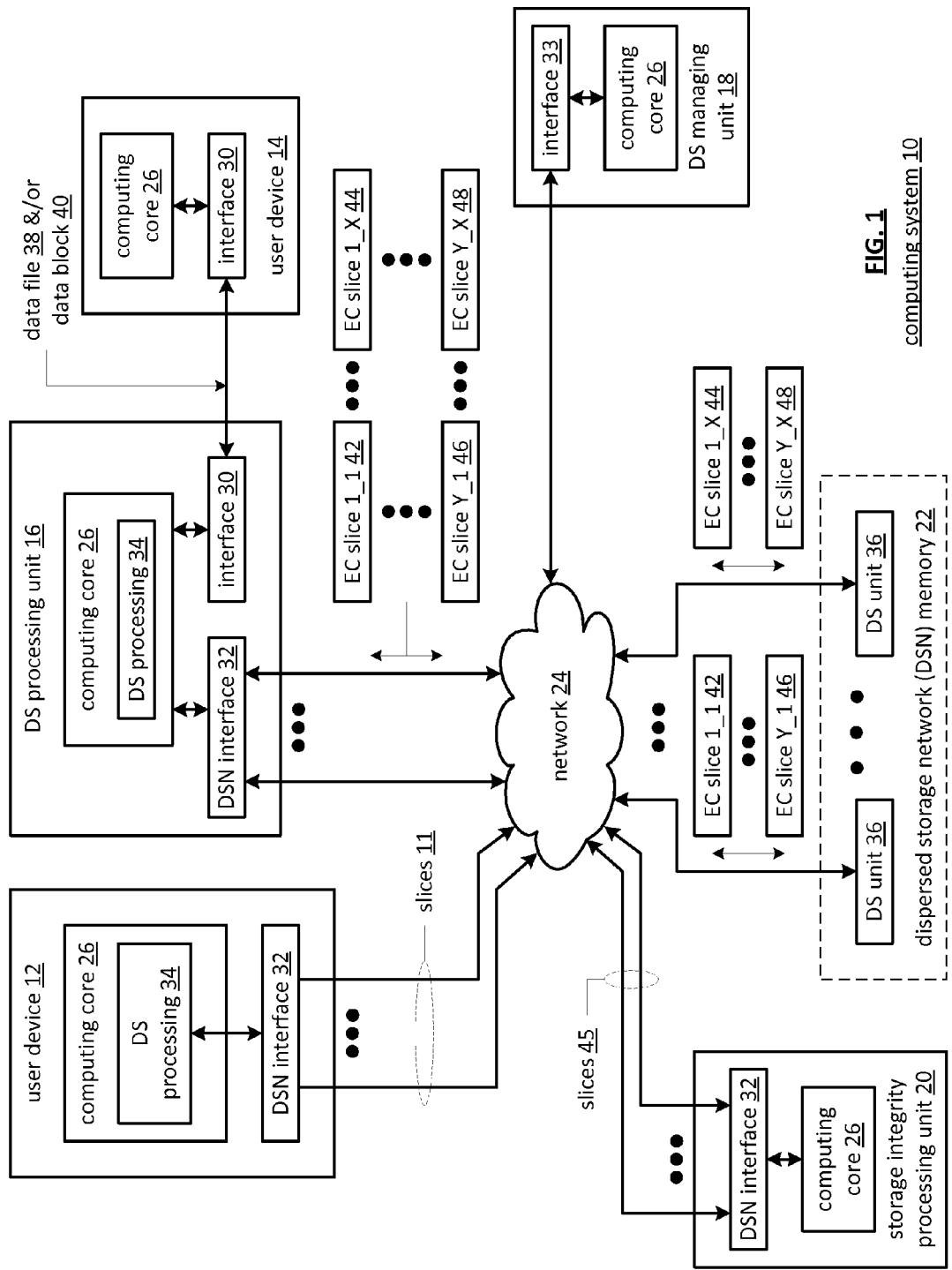
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in the Figures.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-17.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
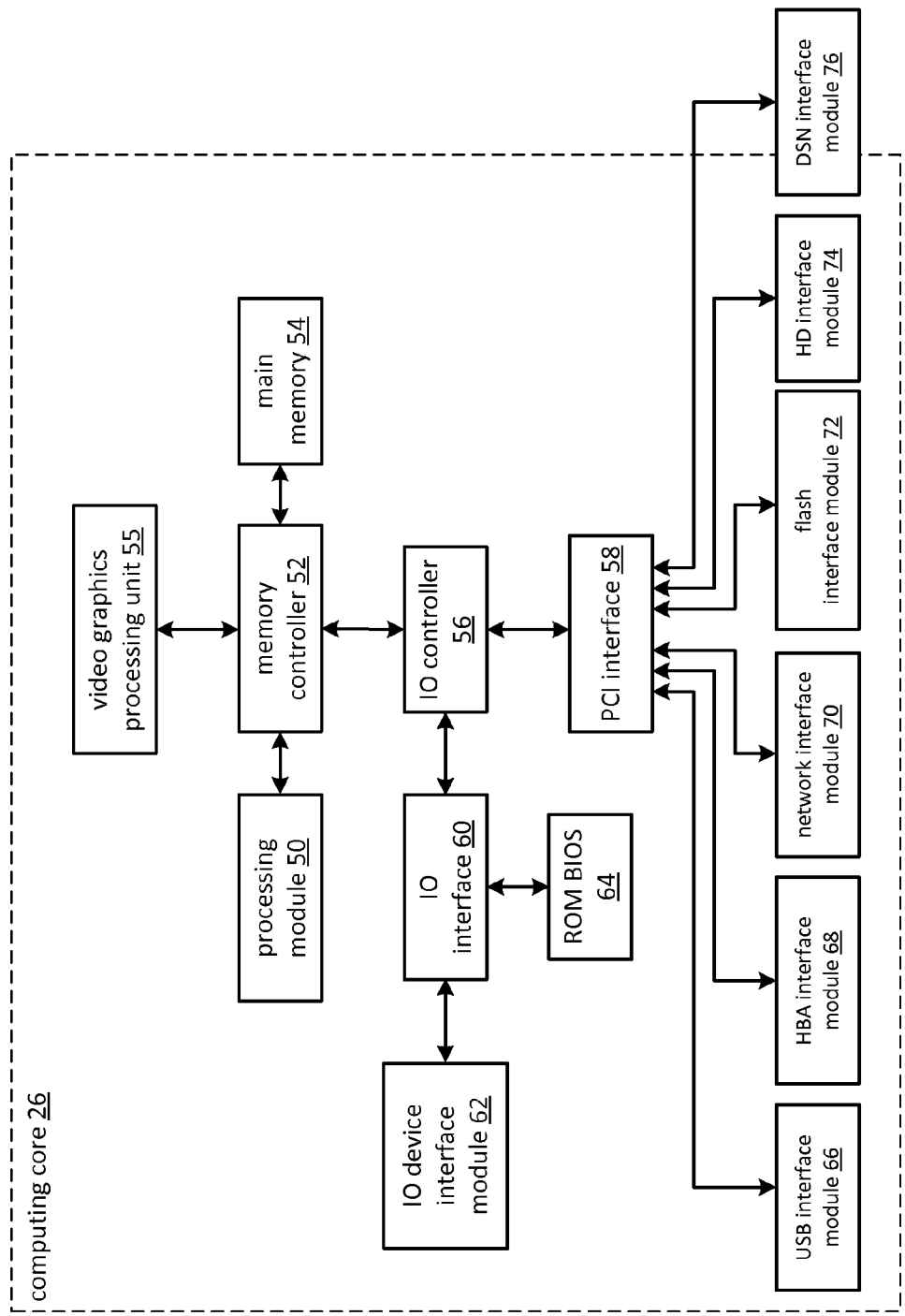
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-17.

Figure 3:
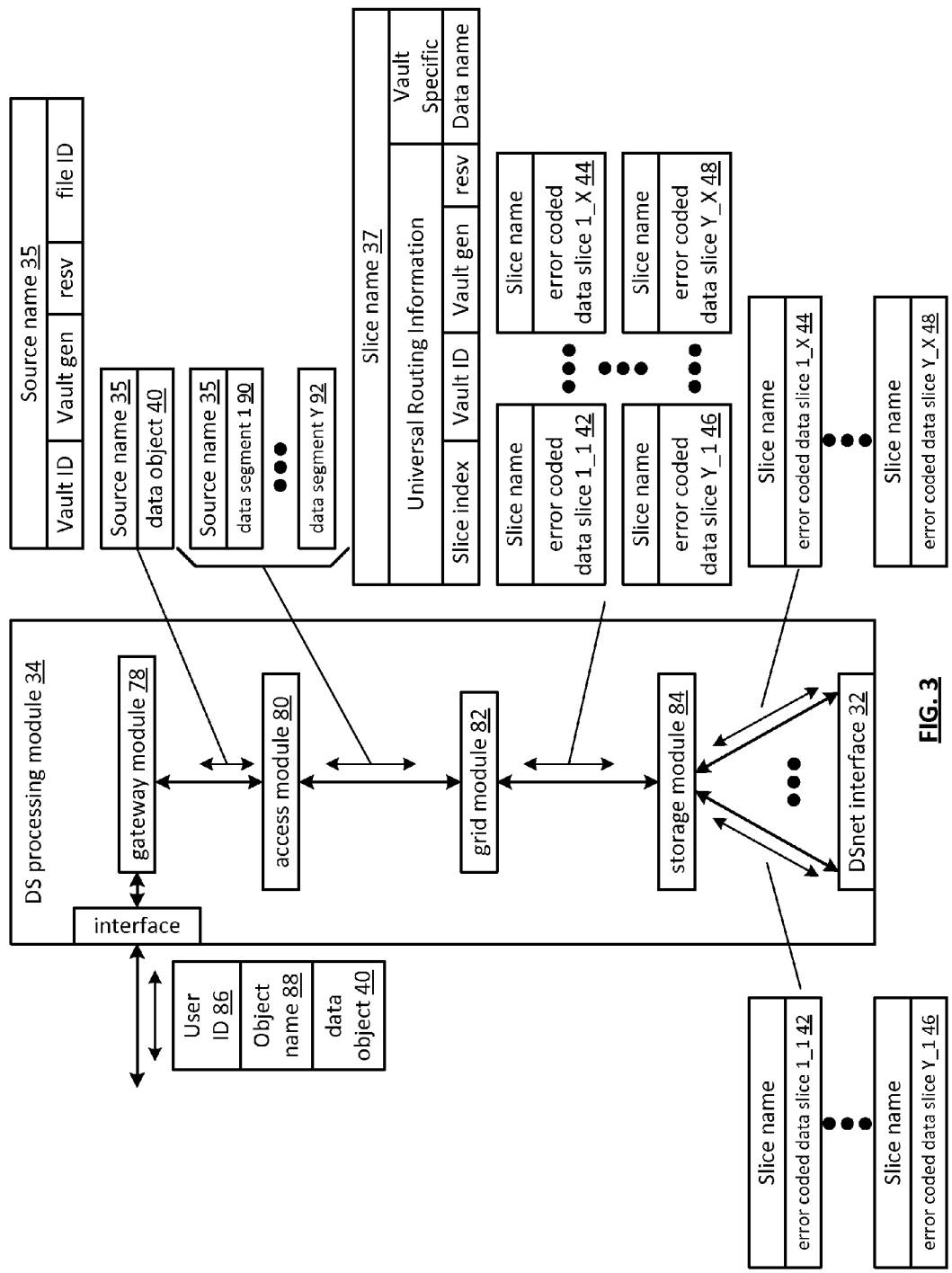
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
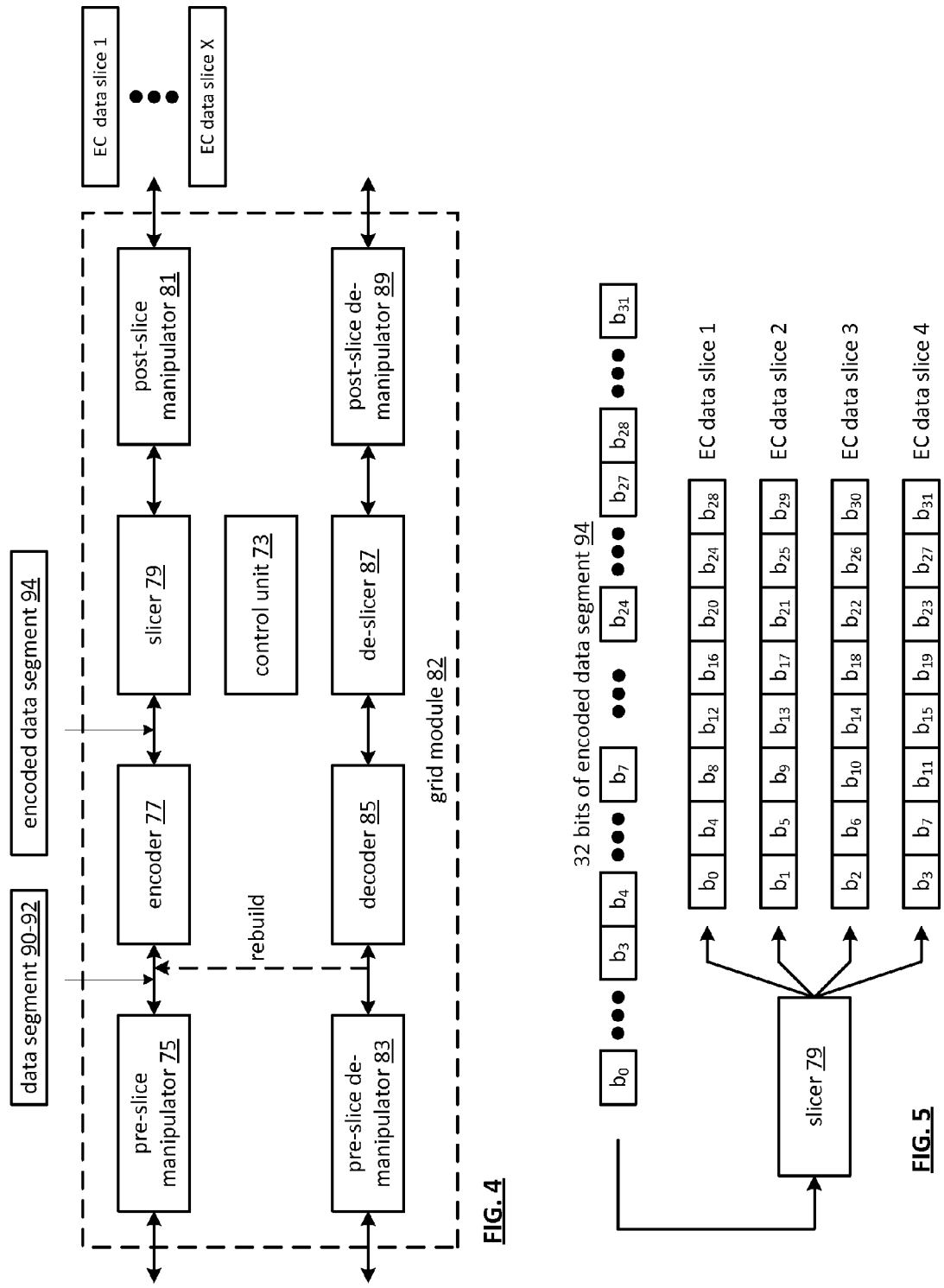
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
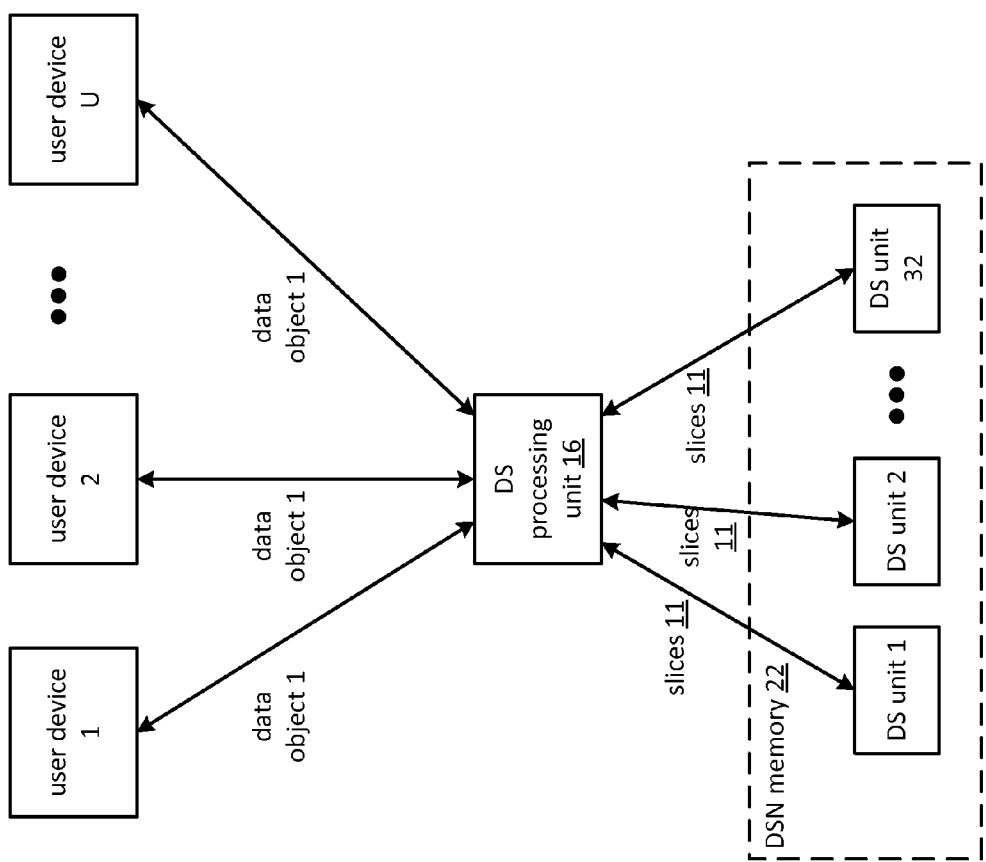
FIG. 6 is a schematic block diagram of another embodiment of a computing system in accordance with the invention.

FIG. 6 is a schematic block diagram of another embodiment of a computing system that includes a plurality of user devices 1-U, a DS processing unit 16, and a DSN memory 22, which includes DS units 1-32. Each of at least some of the user devices 1-U has a unique copy of a common data object (e.g., data object 1) that they store in the DSN memory 22, where the data object 1 may be data, an object file, block file, etc. of user data (e.g., pictures, video files, audio files, etc.), of a user program (e.g., a spreadsheet program, a word processing program, etc.), and/or of an operation system program. The DS processing unit 16 functions to de-duplicate storage of the unique copies of the data object 1 and yet maintains a uniqueness of the copies.

In an example of operation, the DS processing unit 16 receives the data object 1 from one of the user devices. Upon receipt, the DS processing unit 16 determines whether a substantially similar copy (e.g., the same data object with up to a few percent of bit differences) is already stored in the DSN memory 22. Such a determination may be based on one or more of comparing a hash of the data object to a list of hash values corresponding to previously stored data objects, by comparing the data object to previously stored data objects, comparing file directory data, etc.

If data object 1 is not already stored in the DSN memory 22, the DS processing unit 16 stores the data object 1 in the DSN memory as one or more sets of encoded data slices in light of a de-duplication process (or processes). When the data object 1 is already stored, the DS processing unit follows the de-duplication process (or processes) to store de-duplicated copies of the data object 1, where de-duplication process includes one or more of a unique pillar combination scheme, an encryption and compression scheme as the de-duplication process, and/or an optimization factor scheme.

In a unique pillar combination scheme, the DS processing unit 16 encodes the first storage instance of the data object 1 using an error coding dispersal storage function to produce one or more sets of encoded data slices. In addition, the DS processing unit 16 assigns a unique pillar combination to the user device that initiated the first storage of the data object 1. The unique pillar combination indicates a unique pattern for retrieving encoded data slices from the DSN memory for this particular user device. For example, a 32/24 system has a pillar width n=32 and a read threshold of 24 pillars, which has over ten million unique combinations to select 24 read pillars from the 32 pillars.

When another user device requests storage of the data object 1, the DS processing unit recognizes that it is already stored and assigns the other user device its own unique pillar combination. In the above example of over ten million unique pillar combinations, the system can accommodate over ten million user devices storing the data object 1 by storing one complete (or substantially complete) copy of the data object 1 and up to ten million unique pillar combinations such that each user device has its own unique copy of the data object 1 and its own unique retrieval sequence for subsequent private display. Alternatively, the DS processing unit 16 may assign a group of unique pillar combinations to a single user device such that if one combination does not yield a read threshold of encoded data slices due to a system error (e.g., a link is down, a site is down, a storage device failure, etc.), a different combination can be used to retrieve a read threshold of encoded data slices. While this alternative reduces the number of user devices that the system can support for de-duplication of the data object 1, it improves the reliability of data retrieval. Note that one or more methods to create and utilize unique read pillar combinations are discussed in greater detail with reference to FIGS. 7-11.

In an encrypt and compress scheme, the DS processing unit 16 generates an encryption key from the data object 1 for the first storage instance of the data object. For example, the encryption key may be substantially equal to the data object 1, may be substantially equal to a representation of the data object 1 (e.g., a function has been performed on the data object 1), and/or a result of a mathematical function performed on the data object 1. As a specific simplified example, assume that the data object 1 is a digital value of 0110 1011 0101 0100 and the encryption key is set to the same digital value (i.e., 0110 1011 0101 0100). As another specific simplified example, a representation of the data object 1 is created by inverting the second set of four bits (e.g., 0110 0100 0101 0100), the encryption key is set to the digital value of the data slice. As yet another specific simplified example, again assume that the data object is the digital value of 0110 1011 0101 0100 and an encryption key is generated by adding a specific bit pattern (e.g., 0000 0000 0000 0001) to the digital value to produce the encryption key.

Having generating the encryption key, the data object is encrypted using an encryption function. As an example, the data object 1 is the digital value of 0110 1011 0101 0100, the encryption key is also equal to the digital value of 0110 1011 0101 0100, and the encryption function is subtraction. In this example, the resulting encrypted value is 0000 0000 0000 0000 (i.e., 0110 1011 0101 0100-0110 1011 0101 0100).

The resulting encrypted value is then compressed using a compression function. For instance, continuing with the example of the preceding paragraph, the resulting encrypted value of 0000 0000 0000 0000 may be compressed using a run-length compression to yield a compressed value of 01111, where the most significant bit indicates the bit value of the first value is the string and the next four bits represent the run-length of the consecutive number of bits having the bit value. In this example, there are sixteen bits having a bit value of 0. The resulting compressed value may then be error encoded to produce one or more sets of encoded data slices and stored in the DSN memory 22. Alternatively, the data object 1 represented an encoded data slice, where the resulting compressed value is provided to one of the DS units of the DSN memory 22.

When DS processing unit 16 receives a request to store the data object 1 and it is already stored in the DSN memory (or a substantially similar version is stored), the DS processing unit encrypts the data object 1 received from the other user device using the encryption key of the first stored instance of the data object. For instance, assume that the subsequent copy of the data object 1 is the digital value of 0110 1011 0101 0100, the encryption key is 0110 1011 0101 0100, the encryption function is subtraction, such that the resulting encrypted value is 0000 0000 0000 0000, which can be compressed to 01111. As such, the compressed value for a subsequent storage instance of the data object 1 is the same as the first storage instance of the data object 1.

As another example, assume that the subsequent copy of the data object 1 is the digital value of 1110 1011 0101 0100, the encryption key is 0110 1011 0101 0100, the encryption function is subtraction, such that the resulting encrypted value is 1000 0000 0000 0000, which can be compressed to 10001 01110 (a string of one 1s followed by a string of 15 0s). As such, the 1 bit discrepancy between the first storage instance of the data object 1 and the subsequent storage instance of the data object 1 is preserved.

In an optimization factor scheme, the DS processing unit optimizes the first storage instance of the data object 1 and subsequent storage instances of the data object 1 for storage space efficiency, for retrieval efficiency, for processing resource efficiency, for number of user devices, for storage reliability, and/or for retrieval reliability. For example, the number of pillar combinations assigned to a user device may be based on an optimization factor. As a specific example, when an optimization objective is to serve as many user devices as possible, then the optimization factor would dictate assigning one or just a small number of pillar combinations to a user device.

Figure 7:
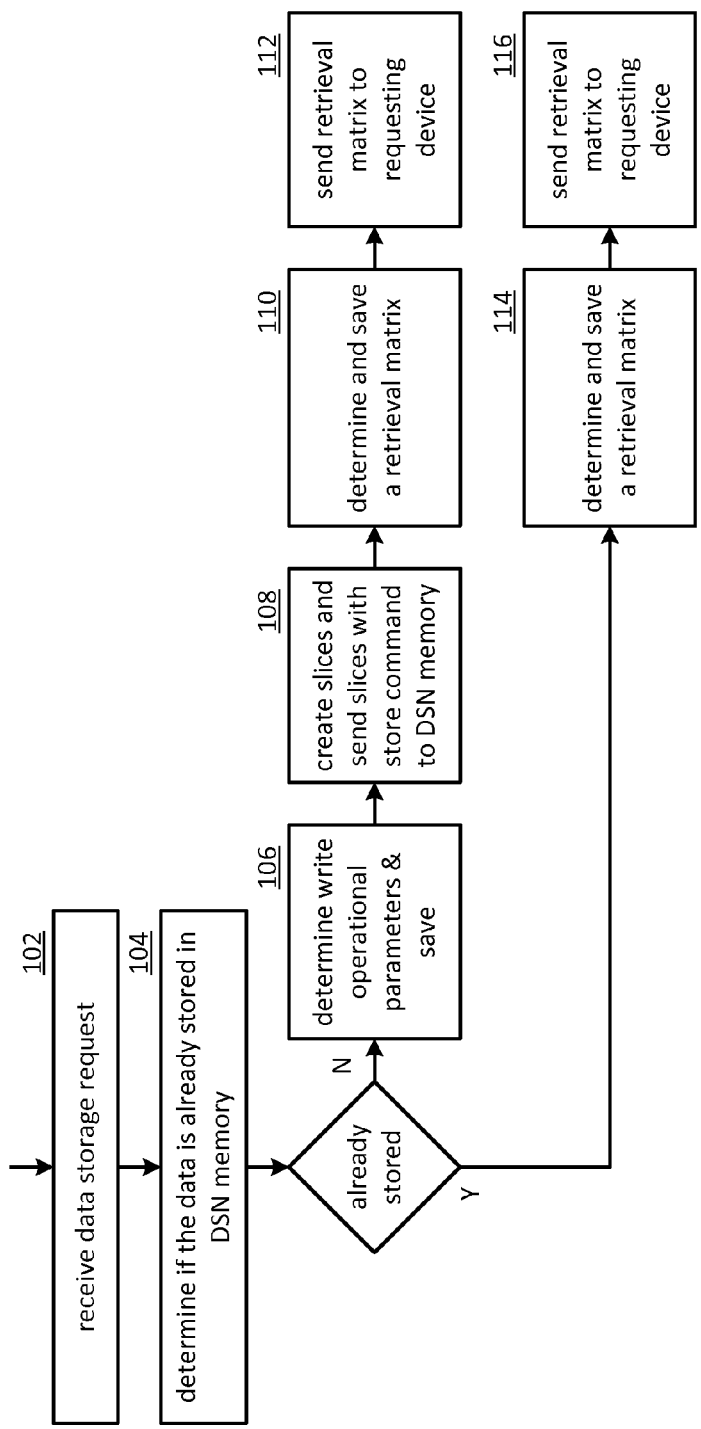
FIG. 7 is a flowchart illustrating an example of storing a data object in accordance with the invention.

FIG. 7 is a flowchart illustrating an example of storing a data object. The method begins at step 102 where a processing module (e.g., of the DS processing of a user device, a DS processing unit, a storage integrity processing unit, and/or a DS managing unit) receives, from a requesting device, a data storage request that includes data for storage. Additionally, the data storage request may include one or more of a store request command, a user ID, an identity of the requesting device, a data object name, a data object, a hash of the data object, a data size, a data type, a priority indicator, a security indicator, and a performance indicator. As an example, the data for storage may be a user application, a user video file, a user picture, a user audio file, a user file (e.g., a presentation file, a reference document, etc.), an operating system application, etc.

The method continues at step 104 where the processing module determines whether substantially identical data is currently stored in a dispersed storage network (DSN) memory. For instance, the processing module determines whether another user device has already stored the data object (or a very similar version of the data object) in the DSN memory. Such a determination includes at least one of determining whether a data identifier associated with the data substantially matches a data identifier associated with the substantially identical data, determining whether a calculated hash of the data substantially matches a stored hash of the substantially identical data, and comparing the data to substantially identical data. The determination may be further based on one or more of comparing the data object with stored data objects, comparing the data object name with data object names of stored data objects, the user ID, the identity of the requesting device, the data object name, the data size, the data type, the priority indicator, the security indicator, and the performance indicator.

For example, the processing module determines that the data object is already stored in the DSN memory when a hash of the data object of the current storage request is the same as a hash of a previously stored data object. Note that the hash of the data object may be received from the requesting device or calculated by the processing module. In another example, the processing module determines whether the data object is stored in the DSN memory based on a comparison of a security indicator of the data object to a threshold.

The method continues to step 106 when the processing module determines that substantially identical data is not currently stored in the DSN memory. At step 106, the processing module determines write operational parameters (e.g., error coding dispersal storage function parameters) and saves the parameters (e.g., so that the processing module may subsequently retrieve the data object). Such a determination may be based on one or more of an estimation of the number of common users that may store this same data object, the user ID, the store request, a vault lookup, a predetermination, a command, the data object name, the data size, the data type, the hash of the data object, the priority indicator, the security indicator, and the performance indicator. For example, the processing module determines the write operational parameters to include a pillar width of n=32 and a read threshold of 24 when the estimation of the number of common users that may store this same data object is 5 million. Note that there are over 10 million ways to choose 24 read pillars from the 32 pillars. The processing module saves the write operational parameters, a hash of the data object, the data object name, and/or a list of hash values of previously stored data objects in the DSN memory for reference when subsequently determining whether the data object is already stored in the DSN memory.

The method continues at step 108 where the processing module encodes at least a portion of the data using an error coding dispersal storage function in accordance with the write operational parameters to produce a set of encoded data slices. The processing module then sends the set of encoded data slices to the DSN memory for storage therein. The method continues at step 110 where the processing module generates a unique retrieval matrix for the requesting device, wherein the unique retrieval matrix identifies a sub-set of encoded data slices of the set of encoded data slices for subsequent retrieval of the at least a portion of the data. Note that the unique retrieval matrix includes at least one of a pillars list, a segmenting protocol, a pre-slice data manipulation function, a forward error correction encoding function, a slicing pillar width, a post-slice data manipulation function, a write threshold, and a read threshold. Alternatively, or in addition to, the unique retrieval matrix includes identity of one or more unique sub-sets of the encoded data slices, where a sub-set includes a number of encoded data slices that includes and between a read threshold of the error coding dispersal storage function and a pillar width of the error coding dispersal storage function.

The unique retrieval matrix further may be generated based on a data identifier associated with the data, a group identification code that identifies a group of requesting devices, an individual identification code of the requesting device, and/or a matrix generating function. Alternatively, or in addition to, the unique retrieval matrix may be generated based on write operational parameters, available pillar combinations, an estimation of the number of common users that may store the same data object, an actual number of common users storing the same data object, a subscription level indicator (e.g., pay for more combinations), a user ID, the store request, a vault lookup, a predetermination, a command, the data object name, the data size, the data type, the hash of the data object, the priority indicator, the security indicator, and the performance indicator. The method continues at step 112 where the processing module sends the unique retrieval matrix to the requesting device and/or stores the unique retrieval matrix.

When the processing module determines that substantially identical data is currently stored in the DSN memory, the method continues at step 114 where the processing module generates a second unique retrieval matrix for the subsequent requesting device. For example, the first requesting device is assigned a unique combination of pillars 1-24 and the second requesting device is assigned a unique combination of pillars 1-22, 25, and 31. The method continues at step 116 where the processing module sends the second unique retrieval matrix to the requesting device and/or stores the second unique retrieval matrix.

Figure 8:
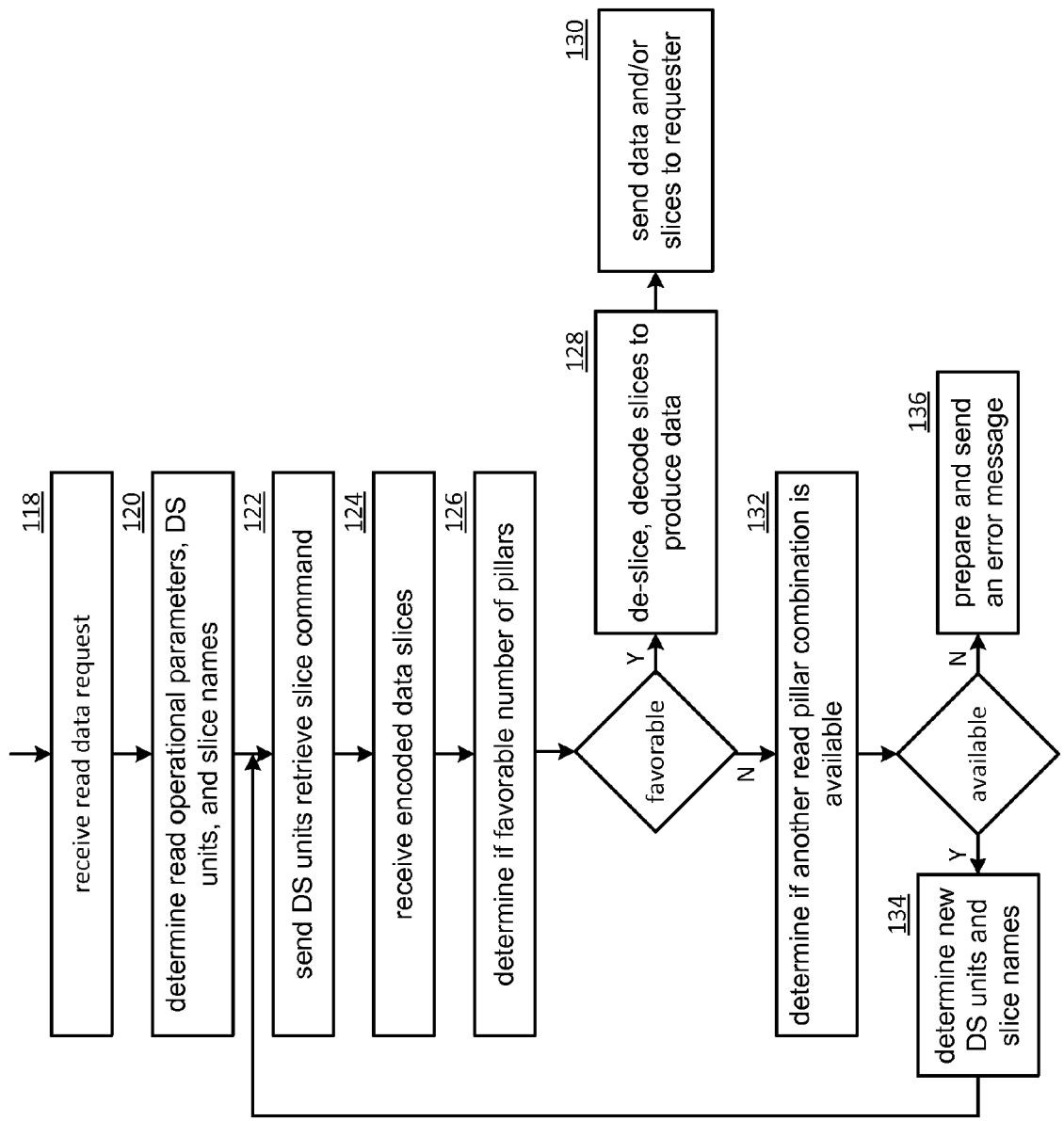
FIG. 8 is a flowchart illustrating an example of retrieving a data object in accordance with the invention.

FIG. 8 is a flowchart illustrating an example of retrieving a data object. The method begins at step 118 where a processing module receives, from a requesting device, a read request for data stored as a plurality of sets of encoded data slices in a dispersed storage network (DSN) memory. Note that the read request may include one or more of a read request command, a user ID, a data object name, a hash of the data object, a data size, a data type, a priority indicator, a security indicator, and a performance indicator.

The method continues at step 120 where the processing module obtains a unique retrieval matrix, read operation parameters, DS units, and/or slice names based on an identity of the requesting device. For example, the processing module obtains the matrix (and the other information) by receiving it from the requesting device, retrieving it from the DSN memory based on the identity of the requesting device, generating it. If the processing module is generating the matrix, it may generate the matrix based on one or more of the identity of the requesting device, an error coding dispersal storage function, a data identifier, a unique retrieval matrix associated with at least one other requesting device of a plurality of requesting devices, a unique retrieval matrix functionality indicator, pillar combinations already tried, a number of available pillar combinations, an estimation of the number of common users that may store this same data, an actual number of common users storing this same data, a subscription level indicator (e.g., pay for more combinations), the user ID, a vault lookup, a virtual DSN address to physical location table, converting a data object name to slice names (e.g., as discussed previously), a predetermination, a command, a data size, a data type, a hash of the data, a priority indicator, a security indicator, and a performance indicator.

The method continues at step 122 where the processing module identifies the DS units storing the sub-set of encoded data slices of a data segment (e.g., a data object or portion thereof) based on the unique retrieval matrix and sends them a retrieval command. The method continues at step 124 where the processing module receives the encoded data slices from the DS units or a portion thereof. As the responses are received, the method continues at step 126 where the processing module determines whether a favorable number of encoded data slices have been received (e.g., a read threshold number or more encoded data slices have been received).

If a favorable number of encoded data slices are received, the method continues at step 128 where the processing module decodes the received encoded data slices to produce a decoded data segment. The method continues at step 130 where the processing module sends the decoded data segment to the requesting device. Alternatively to steps 128 and 130, the processing module sends the sub-set of encoded data slices to the requesting device, which decodes them to recapture the data segment.

When a favorable number of encoded data slices have yet been received in a given time frame, the method continues at step 132 where the processing module determines whether another read pillar combination is available. Such a determination may be based on one or more of pillar combinations already tried, the number of available combinations, an estimation of the number of common users that may store this same data object, the actual number of common users storing this same data object, a subscription level indicator (e.g., pay for more combinations), the user ID, the retrieval request, a vault lookup, a virtual DSN address to physical location table, converting the data object name to slice names (e.g., as discussed previously), a predetermination, a command, the data object name, the data size, the data type, the hash of the data object, the priority indicator, the security indicator, and the performance indicator. For example, the processing module determines that nine of the ten DS unit pillar combinations from the user vault have been tried.

When another read pillar combination is not available, the method continues at step 136 where the processing module prepares an error message where the message may indicate one or more of a retrieval failure indicator, which read pillar combinations did not work, the DS unit storage set, the user ID, the data object name, and which DS units did not respond. The method continues at step 130 where the processing module sends an error message to one or more of the requesting device, a user device, and a DS managing unit.

When another read pillar combination is available, the method continues at step 134 where the processing module identifies a second sub-set of encoded data slices based on the new read pillar combination. For example, the processing module determines to try a DS unit pillar combination from a set of combinations when it has not yet been tried and the DS units of this combination have responded to a previous request and/or have not yet been communicated with regarding this retrieval request. The method branches back to step 122 where the processing module attempts to retrieve the second subset of encoded data slices.

Figure 9:
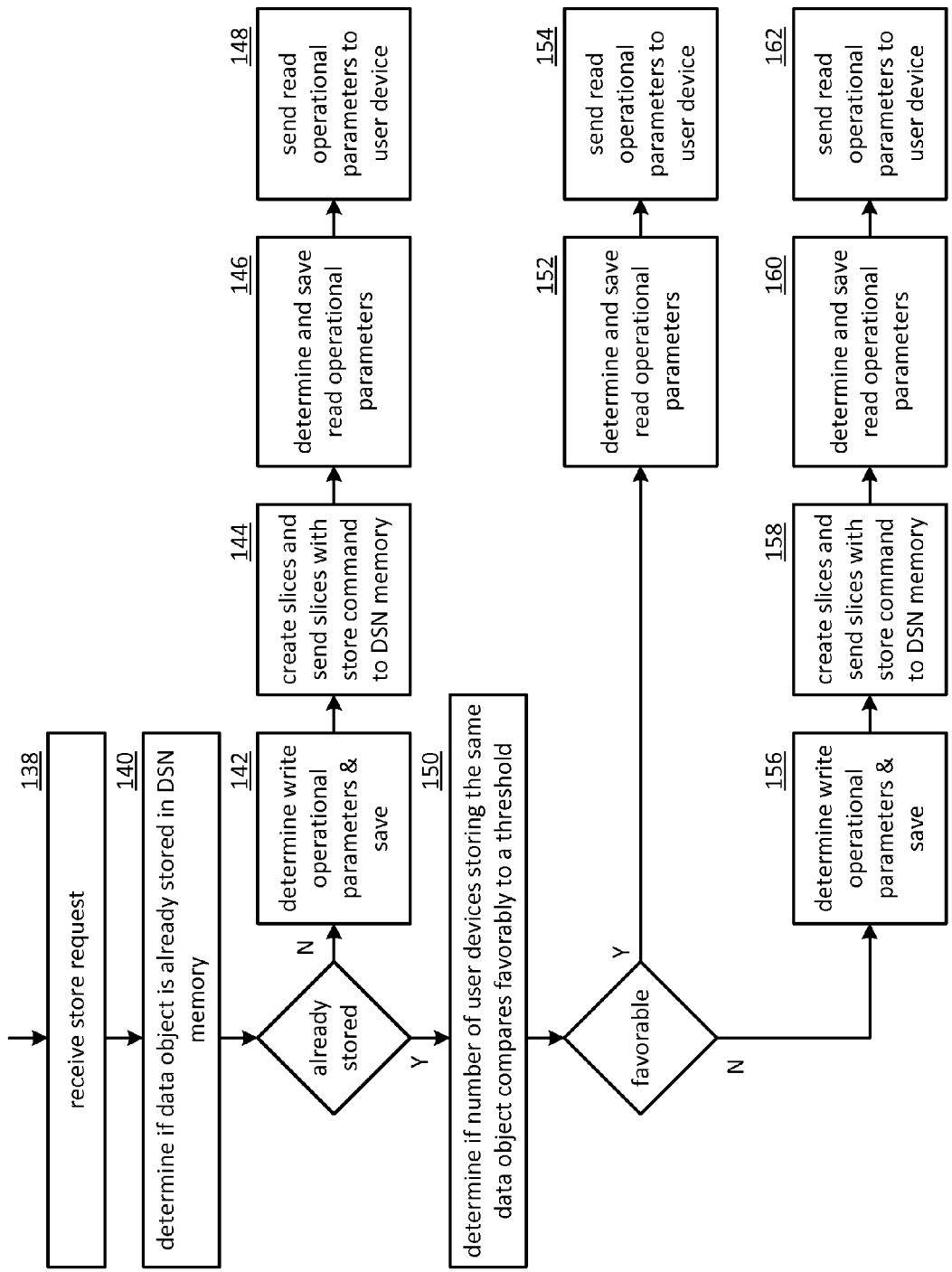
FIG. 9 is another flowchart illustrating another example of storing a data object in accordance with the invention.

FIG. 9 is another flowchart illustrating another example of storing a data object in a de-duplication manner. The method begins with step 138 where a processing module (e.g., of a user device, a DS processing unit, a storage integrity processing unit, and/or a DS managing unit) receiving a store request message (e.g., from a user device). Note that the store request message may include one or more of a store request command, a user ID, a data object name, a data object, a hash of the data object, a data size, a data type, a priority indicator, a security indicator, and/or a performance indicator. At step 140, the processing module determines if a substantially identical version of the data object is already stored in the DSN memory. Such a determination may be based on one or more of comparing the data object with stored data objects, comparing the data object name with data object names of stored data objects, comparing the hash of the data object with hashes of stored data objects, the user ID, the data object name, the data size, the data type, the priority indicator, the security indicator, and the performance indicator.

For example, the processing module determines that the data object is substantially already stored (i.e., a substantially identical version is stored) in the DSN memory when a calculated hash of the data object is the same as a hash of a previously stored data object. Note that the calculated hash of the data object may be received from the requester or calculated by the processing module when the processing module receives the data object. In another example, the processing module determines that the data object is not substantially already stored in the DSN memory when the security indicator of the data object is above a threshold. The processing module may store a copy when the security indicator is above the threshold. The method branches to step 150 when the processing module determines that the data object is substantially already stored in the DSN memory. The method continues to step 142 when the processing module determines that the data object is substantially not already stored in the DSN memory.

At step 142, the processing module determines write operational parameters and saves the parameters (e.g., so that the processing module has a way to retrieve the data object). Such a determination may be based on one or more of an estimation of a number of common users that may store this same data object, a user ID, a store request, a vault lookup, a predetermination, a command, the data object name, a data size, a data type, the hash of the data object, a priority indicator, a security indicator, and a performance indicator. For example, the processing module determines the write operational parameters to include a pillar width of n=32 and a read threshold of 24 when the estimation of the number of common users that may store this same data object is 5 million. Note that there are over 10 million ways to choose 24 read pillars from the 32 pillars. The processing module saves the write operational parameters, hash of the data object, and data object name in a vault, the list of hash values of previously stored data objects, and/or in the DSN memory for reference when subsequently determining if the data object is already stored in the DSN memory.

At step 144, the processing module creates EC data slices of the data object in accordance with the write operational parameters and sends the slices to the DSN memory with a store command. At step 146, the processing module determines and saves read operational parameters in the user vault (e.g., assigned to the user ID), and/or the DSN memory where the read operational parameters includes one or more unique read pillar combinations (e.g., a specific subset of the DS unit pillars of the write operational parameters). Such a determination may be based on one or more of the write operational parameters for this storage set, a number of available combinations for this storage set, an estimation of the number of common users that may store this same data object for this storage set, a actual number of common users storing this same data object for this storage set, a subscription level indicator (e.g., pay for more combinations), a user ID, a store request, a vault lookup, a predetermination, a command, a data object name, a data size, a data type, a hash of the data object, a priority indicator, a security indicator, and a performance indicator.

For example, the processing module may assign the user ID ten unique read pillar combinations for this storage set where each combination comprises at least a read threshold of pillar numbers when the actual number of common users storing this same data object for this storage set is much less than the estimation of the number of common users that may store this same data object for this storage set and when the number of available combinations for this storage set is above a threshold. At step 148, the processing module sends the read operational parameters to the user device such that the processing module of user device may retrieve slices from the DSN memory to recreate the data object. Alternatively, or in addition to, the processing module stores the read operational parameters in the DSN memory as encoded data slices.

At step 150, the processing module determines whether a number of user devices storing the same data object compares favorably to a threshold when the processing module determines that the data object is substantially already stored in the DSN memory. At this step, the processing module is generally determining whether the current level of de-duplication storage of the data object has capacity to accommodate the current storage request without adding noticeable delay, bottlenecking, and/or overburdening processing resources of subsequent retrieval requests.

The processing module determines that the number of user devices storing the same data object compares favorably to a threshold when the retrieved actual number of common users storing this same data object is less than the threshold. For example, the processing module determines that the retrieved actual number of common users storing this same data object is 1,000 and the threshold is 10,000 users. The method branches to step 156 when the processing module determines that the number of user devices storing the same data object does not compare favorably to the threshold. In that scenario, the processing module stores an additional copy of the data object in the DSN memory. The method continues to step 152 when the processing module determines that the number of user devices storing the same data object does compare favorably to the threshold.

At step 152, the processing module determines and saves read operational parameters. Note that in this scenario, the processing module need not store the data object again in the DSN memory. The processing module will assign more unique combinations of read pillars to the user ID. The processing module determines and saves read operational parameters in the user vault (e.g., assigned to the user ID), and/or the DSN memory where the read operational parameters include one or more unique read pillar combinations (e.g., a specific subset of the DS unit pillars of the write operational parameters). Such a determination may be based on one or more of the write operational parameters for this storage set, a number of available combinations for this storage set, an estimation of the number of common users that may store this same data object for this storage set, an actual number of common users storing this same data object for this storage set, a subscription level indicator (e.g., pay for more combinations), a user ID, a store request, a vault lookup, a predetermination, a command, the data object name, the data size, a data type, a hash of the data object, a priority indicator, a security indicator, and a performance indicator.

For example, the processing module may assign the user ID 1,000 unique read pillar combinations where each combination comprises at least a read threshold of pillar numbers when the actual number of common users storing this same data object for this storage set is much less than the estimation of the number of common users that may store this same data object in this storage set, the number of available combinations for this storage set is above a threshold, and subscription level indicator is above a threshold for 1,000 combinations for this storage set. At step 154, the processing module sends the read operational parameters to the user device such that the processing module of user device may retrieve slices from the DSN memory to recreate the data object. Alternatively, or in addition to, the processing module stores the read operational parameters in the DSN memory as encoded data slices.

At step 156, the processing module determines write operational parameters and saves the parameters (e.g., so that the processing module always has a way to retrieve the data object) when the processing module determines that the number of user devices storing the same data object does not compare favorably to the threshold. Such a determination may be based on one or more of the previous write operational parameters (e.g., such that different parameters may be determined), an estimation of the number of common users that may store this same data object, the actual number of common users that have stored this same data object the user ID, the store request, a vault lookup, a predetermination, a command, the data object name, the data size, the data type, the hash of the data object, the priority indicator, the security indicator, and the performance indicator.

For example, the processing module determines the write operational parameters to include a pillar width of n=32 and a read threshold of 24 when the estimation of the number of common users that may store this same data object is 5 million. Note that there are over 10 million ways to choose 24 read pillars from the 32 pillars. Note that the processing module may determine a DS unit storage set that is the same as a previous storage set for the same data object but with different slice names. The processing module saves the write operational parameters, hash of the data object, and data object name in a vault, the list of hash values of previously stored data objects, and/or in the DSN memory for reference when subsequently determining if the data object is already stored in the DSN memory. At step 158, the processing module creates EC data slices of the data object in accordance with the write operational parameters and sends the slices to the DSN memory with a store command for storage therein.

At step 160, the processing module determines and saves read operational parameters in the user vault (e.g., assigned to the user ID), and/or the DSN memory where the read operational parameters includes one or more unique read pillar combinations (e.g., a specific subset of the DS unit pillars of the write operational parameters). Such a determination may be based on one or more of the currently active storage set, the write operational parameters for this storage set, the number of available combinations for this storage set, an estimation of the number of common users that may store this same data object in this storage set, the actual number of common users storing this same data object in this storage set, a subscription level indicator (e.g., pay for more combinations), the user ID, the store request, a vault lookup, a predetermination, a command, the data object name, the data size, the data type, the hash of the data object, the priority indicator, the security indicator, and the performance indicator.

For example, the processing module assigns ten unique read pillar combinations for this storage set where each combination comprises at least a read threshold of pillar numbers when the actual number of common users storing this same data object is much less than the estimation of the number of common users that may store this same data object in this storage set and when the number of available combinations for this storage set is above a threshold. At step 162, the processing module sends the read operational parameters to the user device such that the processing module of user device may retrieve slices from the DSN memory to recreate the data object. Alternatively, or in addition to, the processing module stores the read operational parameters in the DSN memory as encoded data slices.

Figure 10:
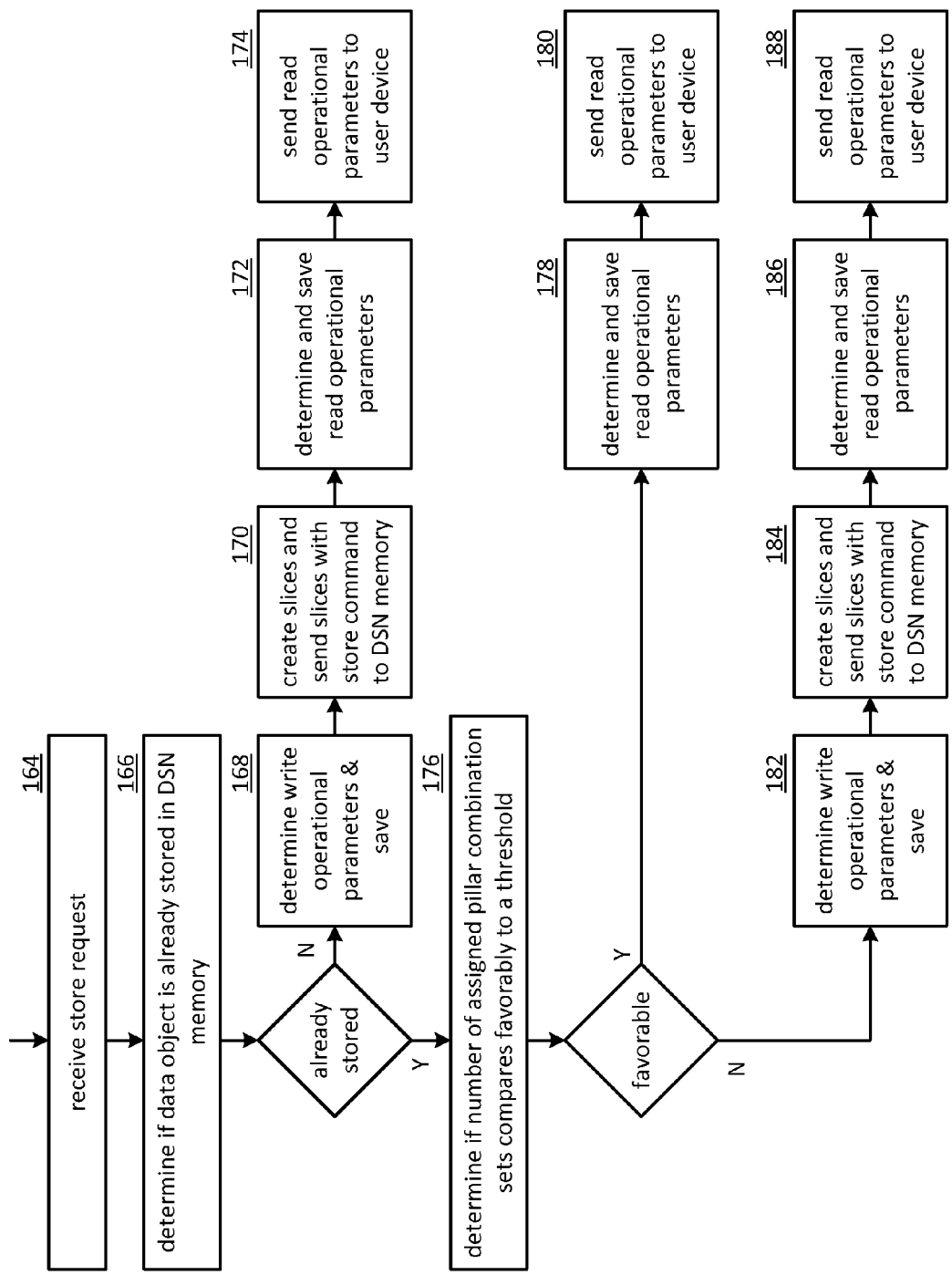
FIG. 10 is another flowchart illustrating another example of storing a data object in accordance with the invention.

FIG. 10 is another flowchart illustrating another example of storing a data object. The method begins with step 164 where a processing module (e.g., of a user device, a DS processing unit, a storage integrity processing unit, and/or a DS managing unit) receiving a store request message (e.g., from a user device). Note that the store request message may include one or more of a store request command, a user ID, a data object name, a data object, a hash of the data object, a data size, a data type, a priority indicator, a security indicator, and/or a performance indicator.

At step 166, the processing module determines if the data object is substantially already stored in the DSN memory. Such a determination may be based on one or more of comparing the data object with stored data objects, comparing the data object name with data object names of stored data objects, comparing the hash of the data object with hashes of stored data objects, the user ID, the data object name, the data size, the data type, the priority indicator, the security indicator, and the performance indicator. For example, the processing module determines that the data object is substantially already stored in the DSN memory when a calculated hash of the data object is the same as a hash of a previously stored data object. Note that the calculated hash of the data object may be received from the requester or calculated by the processing module when the processing module receives the data object. In another example, the processing module determines that the data object is not substantially already stored in the DSN memory when the security indicator of the data object is above a threshold. The processing module may always store a copy when the security indicator is above the threshold. The method branches to step 176 when the processing module determines that the data object is substantially already stored in the DSN memory. The method continues to step 168 when the processing module determines that the data object is substantially not already stored in the DSN memory.

At step 168, the processing module determines write operational parameters and saves the parameters (e.g., so that the processing module always has a way to retrieve the data object). Such a determination may be based on one or more of an estimation of a number of common users that may store this same data object, a user ID, a store request, a vault lookup, a predetermination, a command, the data object name, a data size, a data type, the hash of the data object, a priority indicator, a security indicator, and a performance indicator. For example, the processing module determines the write operational parameters to include a pillar width of n=32 and a read threshold of 24 when the estimation of the number of common users that may store this same data object is 5 million. Note that there are over 10 million ways to choose 24 read pillars from the 32 pillars. The processing module saves the write operational parameters, hash of the data object, and data object name in a vault, the list of hash values of previously stored data objects, and/or in the DSN memory for reference when subsequently determining if the data object is already stored in the DSN memory.

At step 170, the processing module creates EC data slices of the data object in accordance with the write operational parameters and sends the slices to the DSN memory with a store command. At step 172, the processing module determines and saves read operational parameters in the user vault (e.g., assigned to the user ID), and/or the DSN memory where the read operational parameters includes one or more unique read pillar combinations (e.g., a specific subset of the DS unit pillars of the write operational parameters). Such a determination may be based on one or more of the write operational parameters for this storage set, a number of available combinations for this storage set, an estimation of the number of common users that may store this same data object for this storage set, a actual number of common users storing this same data object for this storage set, a subscription level indicator (e.g., pay for more combinations), a user ID, a store request, a vault lookup, a predetermination, a command, a data object name, a data size, a data type, a hash of the data object, a priority indicator, a security indicator, and a performance indicator.

For example, the processing module may assign the user ID ten unique read pillar combinations for this storage set where each combination comprises at least a read threshold of pillar numbers when the actual number of common users storing this same data object for this storage set is much less than the estimation of the number of common users that may store this same data object for this storage set and when the number of available combinations for this storage set is above a threshold. At step 174, the processing module sends the read operational parameters to the user device such that the processing module of user device may retrieve slices from the DSN memory to recreate the data object. Alternatively, or in addition to, the processing module stores the read operational parameters in the DSN memory as encoded data slices.

At step 176, the processing module determines whether the number of number of assigned pillar combinations for the present storage set compares favorably to a threshold when the processing module determines that the data object is substantially already stored in the DSN memory. The processing module determines that the number of assigned pillar combinations for the present storage set compares favorably to a threshold when the retrieved actual number of assigned read pillar combinations for this same data object for the present storage set is less than the threshold. For example, the processing module determines that the number of number of assigned pillar combinations for the present storage set compares favorably to a threshold when the retrieved actual number of assigned read pillar combinations for this same data object for the present storage set is 1,000 and the threshold is 10,000 combinations. The method branches to step 182 when the processing module determines that the number of assigned pillar combination sets does not compare favorably to the threshold. In that scenario, the processing module stores an additional copy of the data object in the DSN memory. The method continues to step 178 when the processing module determines that the number of assigned pillar combination sets does compare favorably to the threshold.

At step 178, the processing module determines and saves read operational parameters. Note that in this scenario, the processing module need not store the data object again in the DSN memory. The processing module will assign more unique combinations of read pillars to the user ID. The processing module determines and saves read operational parameters in the user vault (e.g., assigned to the user ID), and/or the DSN memory where the read operational parameters include one or more unique read pillar combinations (e.g., a specific subset of the DS unit pillars of the write operational parameters). Such a determination may be based on one or more of the write operational parameters for this storage set, a number of available combinations for this storage set, an estimation of the number of common users that may store this same data object for this storage set, an actual number of common users storing this same data object for this storage set, a subscription level indicator (e.g., pay for more combinations), a user ID, a store request, a vault lookup, a predetermination, a command, the data object name, the data size, a data type, a hash of the data object, a priority indicator, a security indicator, and a performance indicator.

For example, the processing module may assign the user ID 1,000 unique read pillar combinations where each combination comprises at least a read threshold of pillar numbers when the actual number of common users storing this same data object for this storage set is much less than the estimation of the number of common users that may store this same data object in this storage set, the number of available combinations for this storage set is above a threshold, and subscription level indicator is above a threshold for 1,000 combinations for this storage set. At step 154, the processing module sends the read operational parameters to the user device such that the processing module of user device may retrieve slices from the DSN memory to recreate the data object. Alternatively, or in addition to, the processing module stores the read operational parameters in the DSN memory as encoded data slices.

At step 182, the processing module determines write operational parameters and saves the parameters (e.g., so that the processing module always has a way to retrieve the data object) when the processing module determines that the number of user devices storing the same data object does not compare favorably to the threshold. Such a determination may be based on one or more of the previous write operational parameters (e.g., such that different parameters may be determined), an estimation of the number of common users that may store this same data object, the actual number of common users that have stored this same data object the user ID, the store request, a vault lookup, a predetermination, a command, the data object name, the data size, the data type, the hash of the data object, the priority indicator, the security indicator, and the performance indicator.

For example, the processing module determines the write operational parameters to include a pillar width of n=32 and a read threshold of 24 when the estimation of the number of common users that may store this same data object is 5 million. Note that there are over 10 million ways to choose 24 read pillars from the 32 pillars. Note that the processing module may determine a DS unit storage set that is the same as a previous storage set for the same data object but with different slice names. The processing module saves the write operational parameters, hash of the data object, and data object name in a vault, the list of hash values of previously stored data objects, and/or in the DSN memory for reference when subsequently determining if the data object is already stored in the DSN memory. At step 184, the processing module creates EC data slices of the data object in accordance with the write operational parameters and sends the slices to the DSN memory with a store command for storage therein.

At step 186, the processing module determines and saves read operational parameters in the user vault (e.g., assigned to the user ID), and/or the DSN memory where the read operational parameters includes one or more unique read pillar combinations (e.g., a specific subset of the DS unit pillars of the write operational parameters). Such a determination may be based on one or more of the currently active storage set, the write operational parameters for this storage set, the number of available combinations for this storage set, an estimation of the number of common users that may store this same data object in this storage set, the actual number of common users storing this same data object in this storage set, a subscription level indicator (e.g., pay for more combinations), the user ID, the store request, a vault lookup, a predetermination, a command, the data object name, the data size, the data type, the hash of the data object, the priority indicator, the security indicator, and the performance indicator.

For example, the processing module assigns ten unique read pillar combinations for this storage set where each combination comprises at least a read threshold of pillar numbers when the actual number of common users storing this same data object is much less than the estimation of the number of common users that may store this same data object in this storage set and when the number of available combinations for this storage set is above a threshold. At step 188, the processing module sends the read operational parameters to the user device such that the processing module of user device may retrieve slices from the DSN memory to recreate the data object. Alternatively, or in addition to, the processing module stores the read operational parameters in the DSN memory as encoded data slices.

Figure 11:
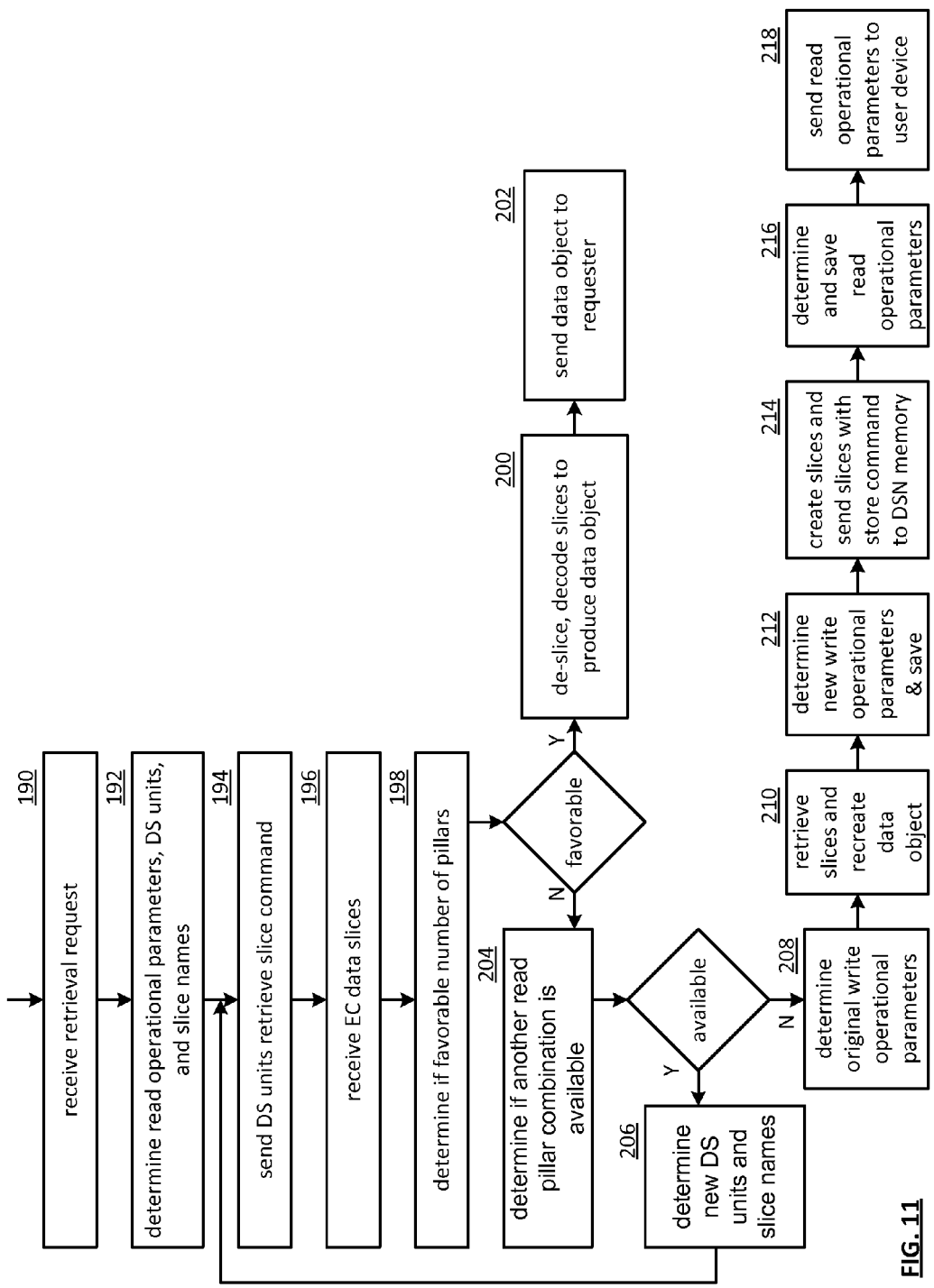
FIG. 11 is another flowchart illustrating another example of retrieving a data object in accordance with the invention.

FIG. 11 is another flowchart illustrating another example of retrieving a data object in accordance with a de-duplication scheme. The method begins at step 190 where a processing module receives a retrieval request message (e.g., from a user device). The method continues at step 192 where the processing module determines read operational parameters, a read DS unit pillar combination, and slice names. Such a determination may be based on one or more of pillar combinations already tried, a number of available combinations, an estimation of the number of common users that may store this same data object, an actual number of common users storing this same data object, a subscription level indicator (e.g., pay for more combinations), the user ID, the retrieval request, a vault lookup, a virtual DSN address to physical location table, converting a data object name to slice names (e.g., as discussed previously), a predetermination, a command, the data object name, the data size, the data type, a hash of the data object, the priority indicator, the security indicator, and the performance indicator. For example, the processing module may determine to try the first of ten DS unit pillar combinations retrieve from a user vault lookup.

The method continues at step 194, the processing module sends the DS units of the read pillar combination the slice names and a retrieve slice command. The DS units retrieve the EC data slices from memory and send the slices to the processing module in response to receiving the slice names and the retrieve slice command. The method continues at step 196 where the processing module receives the EC data slices from the DS units. Note that the processing module may not receive a response from all of the DS units that were sent retrieve commands due to errors and failures.

The method continues at step 198 where the processing module determines whether a favorable number of DS units responded with slices where a favorable number is greater than or equal to the read threshold. When the processing module determines that a favorable number of responses were received, the method continues at step 200 where the processing module de-slices and decodes the slices to produce one or more data segments of the data object in accordance with the read operational parameters and an error coded dispersal storage function. The method continues at step 202 where the processing module sends the data object to the requester. Alternatively, the processing module sends the encoded data slices to the requesting device, which decodes the encoded data slices to recapture the data segments.

When the processing module determines that a favorable number of responses are not received, the method continues to step 204 where the processing module determines whether another read pillar combination is available. Such a determination may be based on one or more of pillar combinations already tried, the number of available combinations, an estimation of the number of common users that may store this same data object, the actual number of common users storing this same data object, a subscription level indicator (e.g., pay for more combinations), the user ID, the retrieval request, a vault lookup, a virtual DSN address to physical location table, converting the data object name to slice names (e.g., as discussed previously), a predetermination, a command, the data object name, the data size, the data type, the hash of the data object, the priority indicator, the security indicator, and the performance indicator. For example, the processing module determines that nine of the ten DS unit pillar combinations from the user vault have been tried.

The method continues step 206 when the processing module determines that another read pillar combination is available. At step 206, the processing module determines new DS units and slice names when the processing module determines that another read pillar combination is available. Such a determination may be based on one or more of pillar combinations already tried, DS units that sent slices, DS units that did not send slices, the number of available combinations, an estimation of the number of common users that may store this same data object, the actual number of common users storing this same data object, a subscription level indicator (e.g., pay for more combinations), the user ID, the retrieval request, a vault lookup, a virtual DSN address to physical location table, converting the data object name to slice names (e.g., as discussed previously), a predetermination, a command, the data object name, the data size, the data type, the hash of the data object, the priority indicator, the security indicator, and the performance indicator. For example, the processing module determines to try the tenth of ten DS unit pillar combinations from the user vault when the first nine have been tried, the tenth has not been tried, and no DS units of the tenth combination failed to send slices in a previous retrieval attempt. The method branches back to step 194 where the processing module sends the DS units the slice names and a retrieve slice command.

When the processing module determines that another read pillar combination is not available, the method branches to step 208 where the DS processing unit determines original write operational parameters. The processing module determines the original write operational parameters based on one or more of a table lookup, a user vault lookup, a command, and/or a predetermination. The method continues at step 210 where the processing module retrieves the EC data slices of the data object from the DSN memory and recreates the data object in accordance with the original write operational parameters.

The method continues at step 212 where the processing module determines new write operational parameters for the new storage set and saves the new parameters (e.g., so that the processing module always has a way to retrieve the data object). Such a determination may be based on one or more of the previous write operational parameters (e.g., such that different parameters may be determined), previous storage sets, an estimation of the number of common users that may store this same data object for this storage set, the actual number of common users that have stored this same data object, the user ID for this storage set, the store request, a vault lookup, a predetermination, a command, the data object name, the data size, the data type, the hash of the data object, the priority indicator, the security indicator, and the performance indicator. For example, the processing module determines the write operational parameters to include a pillar width of n=32 and a read threshold of 24 when the estimation of the number of common users that may store this same data object for this storage set is 5 million. Note that there are over 10 million ways to choose 24 read pillars from the 32 pillars. Note that the processing module may determine a DS unit storage set that is the same as a previous storage set for the same data object but with different slice names. The processing module saves the write operational parameters, hash of the data object, and data object name in a vault, the list of hash values of previously stored data objects, and/or in the DSN memory for reference when subsequently determining if the data object is already stored in the DSN memory.

The method continues at step 214 where the processing module creates EC data slices of the data object in accordance with the new write operational parameters and sends the slices to the new storage set of the DSN memory with a store command for storage therein. The method continues at step 216 where the processing module determines and saves read operational parameters in the user vault (e.g., assigned to the user ID), and/or the DSN memory where the read operational parameters include one or more unique read pillar combinations (e.g., a specific subset of the DS unit pillars of the write operational parameters) for this new storage set. Such a determination may be based on one or more of the currently active storage set, the write operational parameters for this storage set, the number of available combinations for this storage set, an estimation of the number of common users that may store this same data object in this storage set, the actual number of common users storing this same data object in this storage set, a subscription level indicator (e.g., pay for more combinations), the user ID, the store request, a vault lookup, a predetermination, a command, the data object name, the data size, the data type, the hash of the data object, the priority indicator, the security indicator, and the performance indicator.

For example, the processing module assigns ten unique read pillar combinations for this storage set where each combination comprises at least a read threshold of pillar numbers when the actual number of common users storing this same data object is much less than the estimation of the number of common users that may store this same data object in this storage set and when the number of available combinations for this storage set is above a threshold. At step 218, processing module sends the read operational parameters to the user device such that the processing module of user device may retrieve slices from the DSN memory to recreate the data object.

Figure 12:
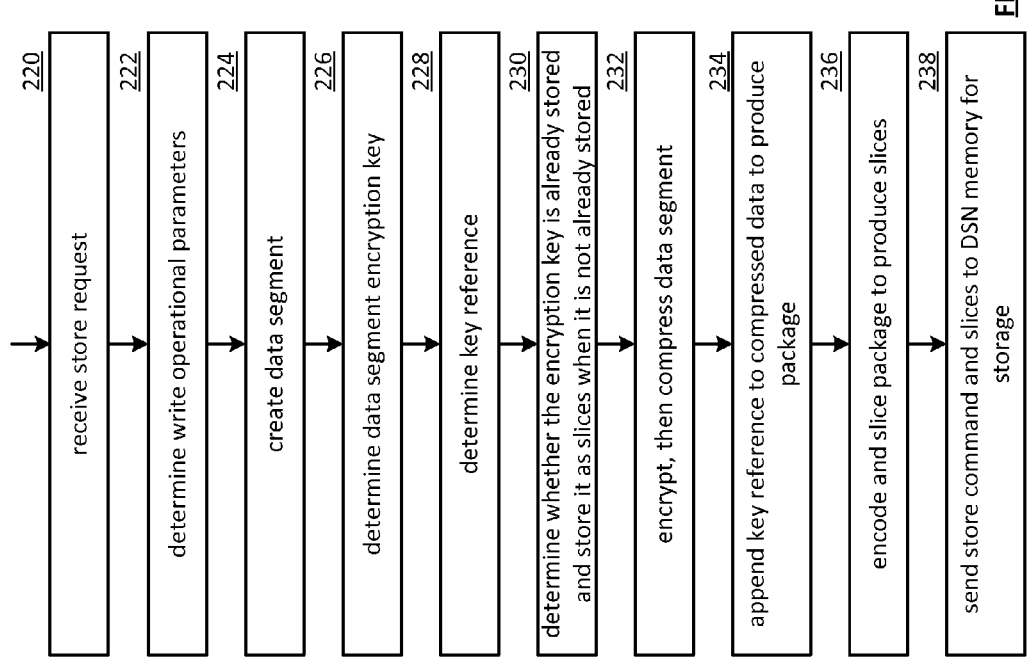
FIG. 12 is another flowchart illustrating another example of storing a data object in accordance with the invention.

FIG. 12 is another flowchart illustrating another example of storing a data object that begins at step 220 where a processing module obtains data to store, which may be done by receiving a store request message that includes the data, by a data lookup, and/or by receiving a data output from an application. The method continues at step 222 where the processing module determines write operational parameters, which may include error coding dispersal storage function parameters such as a pillar width n, a read threshold, a write threshold, a data segment size, a compression algorithm, an encryption algorithm (e.g., Data Encryption Standard, Advanced Encryption Standard, a mathematical transformation, etc.), an error coding algorithm, and/or a slicing algorithm. Such a determination may be based on one or more of the user ID, the store request, a vault lookup, a predetermination, a command, the data object name, the data size, the data type, the hash of the data object, the priority indicator, the security indicator, and the performance indicator.

The method continues at step 224 where the processing module creates a data segment of the data object in accordance with the write operational parameters. The method continues at step 226 where the processing module generates a first encryption key based on the data. For example, the first encryption key is established to be substantially equal to the data. As another example, a function is performed on the data to produce a representation of the data and the first encryption key is established to be substantially equal to the representation of the data. Note that the function may include a reversible transformation (e.g., equivalency, adding a constant, subtracting a constant, inverting bits, etc.). The processing module selects the method to generate the first encryption key based on one or more of the data, a key table (e.g., a list of previous keys), a user ID, a store request, a vault lookup, a predetermination, a command, a data object name, a data size, a data type, a hash of the data, a priority indicator, a security indicator, and the performance indicator. For example, the processing module selects the equivalency transformation when a vault lookup based on the user ID indicates to utilize the equivalency transformation.

The method continues at step 228 where the processing module generates a key reference based on the first encryption key, which includes storage location information of the first encryption key. The generation of the key reference may be based on one or more of the first encryption key, a transformation of the first encryption key, a hash of the first encryption key, the data segment, a key table (e.g., a list of previous keys indexed by key references), a virtual DSN address of where the first encryption key is stored, the user ID, the store request, a vault lookup, a predetermination, a command, the data object name, the data size, the data type, the hash of the data object, the priority indicator, the security indicator, and the performance indicator. In an example, the processing module calculates a hash of the first encryption key to produce the key reference when the transformation is a secure hash algorithm function (e.g., SHA-512).

The method continues at step 230 where the processing module determines whether substantially similar data to the data is stored. Such a determination may be based on generating the first encryption key based on the data, comparing a representation of the first encryption key with a representation of the encryption key of the substantially similar data, and, when the representation of first encryption key compares favorably with the representation of the encryption key of the substantially similar data, indicating that the substantially similar data is stored. Note that the representation may substantially be the first encryption key or the key reference. For instance, processing module may search a key reference table for the key reference. The key reference table entries may be indexed by a corresponding key reference. For example, key reference 1A35 ... E59 (e.g., 64 bytes) may link to a virtual DSN address 40B7 ... DE6 (e.g., 48 bytes) where the encryption key is stored in a dispersed storage network (DSN) memory. A method to ensure that the encryption key and the key reference are securely and/or accurately stored is discussed in greater detail with reference to FIG. 14.

If, at step 230, the encryption key is not stored, the processing module creates one based on the data as previously discussed and stores it. The method continues at step 232 where the processing module encrypts the data using the first encryption key in accordance with the encryption function to produce first encrypted data. Alternatively, the processing module encrypts the data using an encryption key of the substantially similar data in accordance with an encryption function to produce encrypted data. For example, assume that the encryption function is a subtraction mathematical transformation and the processing module encrypts the data by subtracting the first encryption key from the data to produce the first encrypted data. In this example, when the encryption key substantially equals the data, the resulting encrypted data will be almost all zeros (e.g., all zeros if the encryption key equals the data).

The processing module then compresses the encrypted data in accordance with a compression function to produce first compressed data. The compression function may be a run-length encoding function, a Lempel-Ziv-Welch compression algorithm, a Huffman compression algorithm, a Golomb compression algorithm, a fractal compression algorithm, a wavelet compression algorithm, etc. The processing module may then further encrypt the compressed data using a second encryption algorithm to produce further encrypted data.

The method continues at step 234 where the processing module appends the key reference (e.g., 64 bytes) to the compressed data (e.g., 1 byte) to produce a package (e.g., 65 bytes). The method continues at step 236 where the processing module encodes the package to produce encoded data slices utilizing an error coding dispersal storage function and in accordance with the write operational parameters. Note that the encoded data slices may be quite small when the package (e.g., 65 bytes) results from the compressed data of zero (e.g., one byte). Alternatively, processing module may locally store the compressed data without encoding the compressed data to produce the encoded data slices.

The method continues at step 238 where the processing module stores the compressed data. For example, the processing module sends the encoded data slices with a store command to the DSN memory for storage in accordance with the write operational parameters. In another example, the processing module locally stores the encoded data slices. In another example, the processing module locally stores the compressed data. Note that the method described above may repeat for each of a plurality of portions of data (e.g. data segments) that comprise a data object.

In another example of operation, a method begins with the processing module obtaining data to store and determining whether substantially similar data to the data is stored. Such a determination may be accomplished by comparing a representation of the encryption key with a representation of the encryption key of the substantially similar data. The processing module indicates that the substantially similar data is not stored when the processing module determines that the representation of encryption key compares unfavorably with the representation of the encryption key of the substantially similar data. The method of the other example continues where the processing module generates an encryption key to be substantially similar to the data when the processing module determines that substantially similar data is not stored. Next, the processing module generates a key reference regarding the encryption key and performs a mathematical function on the data based on the encryption key to produce a data result having a near constant bit pattern (e.g., it is very compressible). Next, the processing module compresses the data result in accordance a compression function (e.g. to eliminate a constant string of the same bits) to produce compressed data. Next, the processing module stores the compressed data and the key reference in a first storage manner. In an instance, the processing module stores the compressed data and the key reference in local secure memory. Next, the processing module stores the encryption key in a second storage manner. In an instance, the processing module stores the encryption key as a plurality of encoded data slices in dispersed storage network memory.

Figure 13:
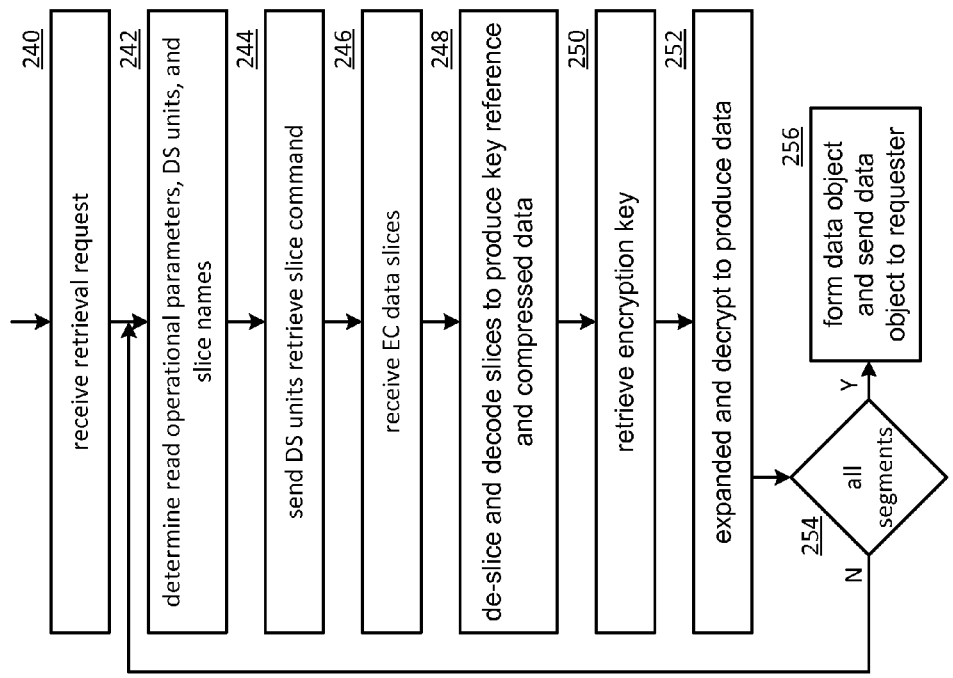
FIG. 13 is another flowchart illustrating another example of retrieving a data object in accordance with the invention.

FIG. 13 is another flowchart illustrating another example of retrieving a data object. The method begins with step 240 where a processing module (e.g. of a user device, a DS processing unit, a storage integrity processing unit, and/or a DS managing unit) receives a retrieval request message (e.g., from a requesting device). The retrieval request message may include one or more of a retrieval request command, a user ID, a data object name, a hash of the data object, a data size, a data type, a priority indicator, a security indicator, and a performance indicator.

At step 242, the processing module determines read operational parameters, DS units, and slice names. Such a determination may be based on one or more of write operational parameters, a decompression algorithm, a decryption algorithm (e.g., Data Encryption Standard, Advanced Encryption Standard, a mathematical transformation, etc.), the user ID, the retrieval request, a vault lookup, a virtual DSN address to physical location table, converting the data object name to slice names (e.g., as discussed previously), a predetermination, a command, the data object name, the data size, the data type, the hash of the data object, the priority indicator, the security indicator, and the performance indicator.

At step 244, the processing module sends the DS units of a read pillar combination the slice names and a retrieve slice command. The DS units retrieve the encoded data slices from memory and send the encoded data slices to the processing module in response to receiving the slice names and the retrieve slice command. At step 246, the processing module receives the encoded data slices from the DS units. At step 248, processing module de-slices and decodes the encoded data slices utilizing an error coding dispersal storage function and in accordance with the read operational parameters to produce a key reference and compressed data.

At step 250, processing module retrieves an encryption key based on the key reference. For example, the processing module determines the virtual DSN address of where the encryption key is stored by utilizing the key reference as an index into a key reference table. Next, the processing module retrieves encoded data slices of the encryption key from the determined virtual DSN address of where the encryption key is stored. The processing module de-slices and decodes the encoded data slices utilizing an error coding dispersal storage function to produce the encryption key.

The method continues at step 252 where the processing module decompresses (e.g., expands) the compressed data in accordance with the read operational parameters (e.g., the decompression algorithm) to produce encrypted data. The processing module decrypts the encrypted data in accordance with the read operational parameters (e.g., the decryption algorithm) and utilizing the encryption key to produce the data. In an example, the decryption algorithm is an addition mathematical transformation. In an instance, the processing module decrypts the encrypted data by adding the encryption key to the encrypted data to produce the data. Note that the addition result may be the same as the encryption key when the encryption key was previously determined to be equal to the data (e.g., and the encrypted data is zero). Note that the data may be one of a portion of a data object, a data segment of the data object, and an encoded data slice of the data segment.

At step 254, the processing module determines if all portions of the data have been recreated based on the data object size and the size of data portions (e.g., segments slices) produced so far. The method branches back to step 242 when the processing module determines that all of the data has not been recreated. The method continues to step 256 when the processing module determines that all of the data portions have been recreated. At step 256, the processing module forms the entire data (e.g., a data object) from all of the produced data portions in accordance with the read operational parameters. The processing module sends the data object to the requesting device.

Figure 14:
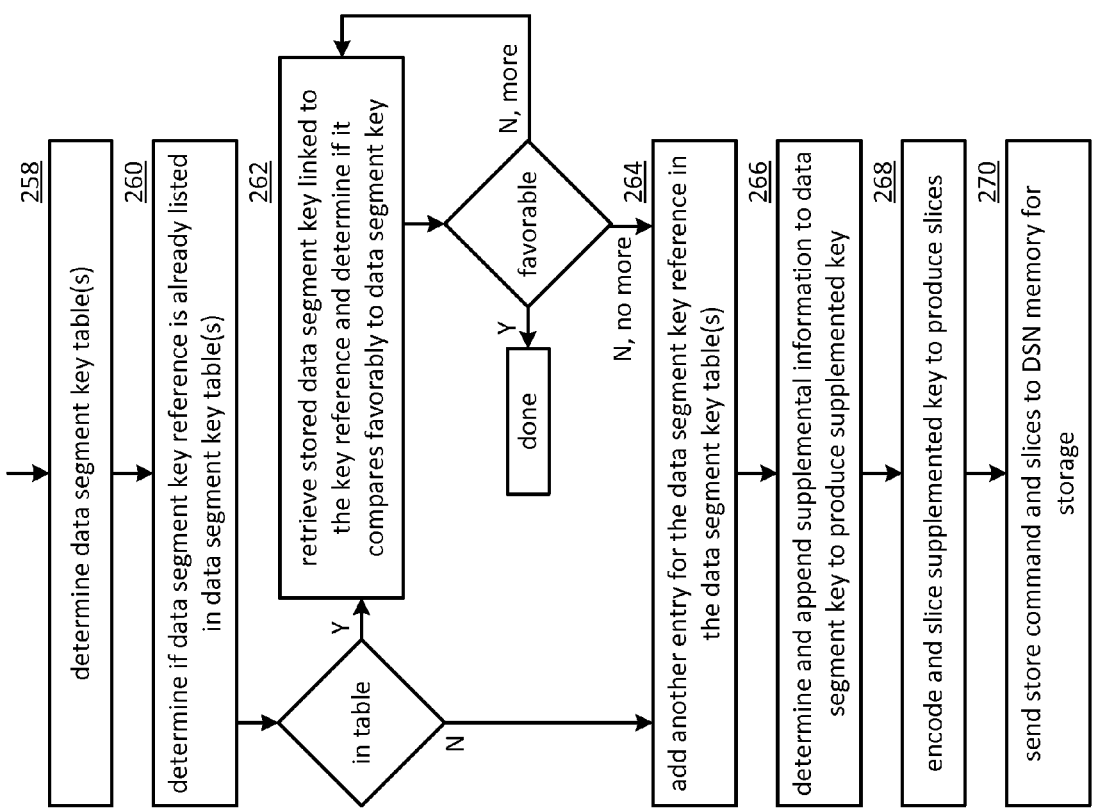
FIG. 14 is a flowchart illustrating an example of storing a key in accordance with the invention.

FIG. 14 is a flowchart illustrating an example of storing a key. The method begins with step 258 where a processing module (e.g., of a user device, a DS processing unit, a storage integrity processing unit, and/or a DS managing unit) determines a data segment key table(s). Note that the data segment key table may list previous data segment keys (e.g., where a unique encryption key is associated with each unique data segment) and/or virtual DSN addresses of where previous data segment keys are stored. In an instance, the table entries are indexed by a corresponding data segment key reference. Such a determination may be based on one or more of a present data segment, available data segment key table(s), a user ID, a vault lookup, a predetermination, a command, the data object name, a data size, a data type, a hash of the data object, a priority indicator, a security indicator, and/or a performance indicator. In an example, the processing module may determine the data segment key tables to be tables affiliated with the present user ID and user vault.

At step 260, processing module determines if the data segment key reference (input to this method) is already substantially listed in the data segment key tables. Note that a listing is an indicator that the corresponding data segment key is stored in a dispersed storage network (DSN) memory. Such a determination may be based on one or more of comparing the data segment key reference to the data segment key reference entries in the data segment key tables, the present data segment, available data segment key table(s), the user ID, the vault lookup, the predetermination, the command, the data object name, the data size, the data type, the hash of the data object, the priority indicator, the security indicator, and the performance indicator. In an example, the processing module determines that the data segment key reference is already substantially listed in the data segment key tables when the comparison of the data segment key reference to a data segment key reference entry in a data segment key table indicates that they are the same. In another example, the processing module determines that the data segment key reference is already substantially listed in the data segment key tables when the comparison of the data segment key reference to a data segment key reference entry in a data segment key table indicates that the difference is below a threshold (e.g., less than 3 bits difference). The method branches to step 264 when the processing module determines that the data segment key reference is not already substantially listed in the data segment key tables. The method continues to step 262 when the processing module determines that the data segment key reference is already substantially listed in the data segment key tables.

At step 262, the processing module retrieves the stored data segment key linked to the data segment key reference to produce a retrieved data segment key. In an example, the processing module determines the virtual DSN address of where the data segment key is stored by utilizing the data segment key reference as an index into the data segment key table. The processing module retrieves the slices of the data segment key from the determined virtual DSN address of where the data segment key is stored. The processing module de-slices and decodes the slices in accordance with an error coding dispersal storage function to produce the retrieved data segment key. At step 262, the processing module determines if the retrieved data segment key compares favorably to the data segment key to verify the key is appropriate. Such a determination may be based on one or more of comparing the retrieved data segment key to the data segment key, comparing the data segment key reference to the data segment key reference entry from the data segment key table, the present data segment, available data segment key table(s), the user ID, the vault lookup, the predetermination, the command, the data object name, the data size, the data type, the hash of the data object, the priority indicator, the security indicator, and the performance indicator. In an example, the processing module determines that the retrieved data segment key compares favorably to the data segment key when the retrieved data segment key is substantially the same as the data segment key. In an instance, the processing module determines that the retrieved data segment key compares favorably to the data segment key when the comparison of the retrieved data segment key to the data segment key indicates that they are exactly the same and when a vault lookup indicates a strict standard of comparison. In another instance, the processing module determines that the retrieved data segment key compares favorably to the data segment key when the comparison of the retrieved data segment entry to the data segment key indicates that the difference is below a threshold (e.g., less than 3 bits difference) and when a vault lookup indicates a relaxed standard of comparison and a threshold of 3 bits. The method ends when the processing module determines a favorable comparison. The method branches back to step 262 when the comparison was unfavorable and there are more data segment key tables to check. The method continues to step 264 when the processing module determines an unfavorable comparison and all of the data segment key tables were checked.

At step 264, the processing module adds another entry for the data segment key reference in the data segment key table (s). Note that the entry may include the data segment key reference, the data segment key, and/or a virtual DSN address of where the data segment key will be stored. At step 266, the processing module determines and appends supplemental information to the data segment key to produce a supplemented key. Such a determination may be based on one or more of the present data segment, the user ID, the vault lookup, the predetermination, the command, the data object name, the data size, the data type, the hash of the data object, the priority indicator, the security indicator, and the performance indicator. Note that the supplemental information may include one or more of the user ID, the vault ID, the data object name, the data size, the data type, the hash of the data object, the priority indicator, the security indicator, and the performance indicator. For example, the processing module determines to append the user ID and the data object name when the vault lookup indicates to append directory references.

At step 268, the processing module encodes and slices the supplemented key utilizing an error coding dispersal storage function and in accordance with the operational parameters in a vault for the data segment keys and/or operational parameters retrieved from a user vault to produce slices. At step 270, processing module sends a store command and the slices to the DSN memory for storage in accordance with the operational parameters in a vault for the data segment keys and/or operational parameters retrieved from a user vault.

FIG. 15 is another flowchart illustrating another example of storing a data object. The method begins with step 272 where a processing module receives a store request message (e.g., from a user device). The store request message may include one or more of a store request command, a user ID, a data object name, a data object, a hash of the data object, a data size, a data type, a priority indicator, a security indicator, and a performance indicator. At step 274, the processing module determines write operational parameters where the write operational parameters may include one or more of a pillar width n, a read threshold, a write threshold, a data segment size, a compression algorithm, an encryption algorithm (e.g., Data Encryption Standard, Advanced Encryption Standard, a mathematical transformation, etc.), and error coding algorithm, and a slicing algorithm. Such a determination may be based on one or more of the user ID, the store request, a vault lookup, a predetermination, a command, the data object name, the data size, the data type, the hash of the data object, the priority indicator, the security indicator, and the performance indicator.

At step 276, the processing module creates data segment(s) of the data object in accordance with the write operational parameters. The processing module encodes and slices the data object utilizing an error coding dispersal function and in accordance with the write operational parameters to produce one or more slices. The processing module determines slice names for the slices as discussed previously. The method discussed below is applied to each slice.

At step 278, the processing module determines a slice key where the slice key will be subsequently utilized to encrypt the slice. Such a determination may be based on one or more of the data segment, the slice, a slice key table (e.g., a list of previous keys), the user ID, the store request, a vault lookup, a predetermination, a command, the data object name, the data size, the data type, the hash of the data object, the priority indicator, the security indicator, and the performance indicator. In an example, the processing module determines the slice key to be based on a transformation of the slice. In an instance, the processing module determines the slice key to be equal to the slice when the transformation is equivalency.

At step 280, the processing module determines a slice key reference where the slice key reference will be subsequently attached to the stored slice(s) to enable decryption when the slice(s) are retrieved. Such a determination may be based on one or more of the slice key, a transformation of the slice key, a hash of the slice key, the data segment, the slice, a slice key table (e.g., a list of previous keys indexed by key references), a virtual DSN address of where the slice key is stored, the user ID, the store request, a vault lookup, a predetermination, a command, the data object name, the data size, the data type, the hash of the data object, the priority indicator, the security indicator, and the performance indicator. In an example, the processing module determines the slice key reference to be based on a transformation of the slice key. In an instance, the processing module determines the slice key reference to be the hash of the slice key when the transformation is a secure hash algorithm function (e.g., SHA-512).

At step 282, the processing module determines whether the slice key and the slice key reference are already stored and ensures that the slice key and the slice key reference are stored when not already stored to enable subsequent retrieval. The processing module checks a slice key table to determine if the slice key reference is already listed. The processing module adds the slice key reference to the slice key table and stores the slice key in a dispersed storage network (DSN) memory saving the virtual DSN address of where the slice key is stored in the slice key table when the processing module determines that the slice key reference is not already saved in the slice key table. Note that the slice key table may list previous slice keys and/or virtual DSN addresses of where the previous slice keys are stored. The table entries may be indexed by the corresponding slice key reference. For example, slice key reference 1A35 . . . E59 (e.g., 64 bytes) may link to the virtual DSN address 40B7 . . . DE6 (e.g., 48 bytes) where the slice key is stored. The method to ensure that the slice key and the slice key reference are saved is discussed in greater detail with reference to FIG. 17.

At step 284, the processing module encrypts and then compresses the slice. The processing module encrypts the slice utilizing the slice key in accordance with the encryption algorithm of the write operational parameters. In an example, the encryption algorithm is a subtraction mathematical transformation. In an instance, the processing module encrypts the slice by subtracting the slice key from the slice to produce the encrypted slice. Note that the subtraction result may be zero when the slice key was previously determined to be equal to the slice. The processing module compresses the encrypted slice in accordance with the compression algorithm of the write operational parameters to produce a compressed encrypted slice. In an instance, the processing module compresses the encrypted slice of zero (e.g., many bytes) to produce a compressed encrypted slice of zero (e.g., one byte).

At step 286, processing module appends the slice key reference (e.g., 64 bytes) to the compressed encrypted slice (e.g., 1 byte) to produce a package (e.g., 65 bytes). At step 288, processing module encodes and slices the package utilizing an error coding dispersal storage function and in accordance with the write operational parameters to produce slices. In an example, the write operational parameters may specify a null encoder and a null slicer such that the processing module produces one slice that is the same as the package. Note that the one slice may be quite small when the package (e.g., 65 bytes) results from the compressed encrypted slice of zero (e.g., one byte).

At step 290, the processing module sends the slice(s) with a store command to the DSN memory for storage in accordance with the write operational parameters. Note that the virtual DSN address (slice name) may be the same as the slice name determined in the step above when the processing module created the data segment and slice. Note that the above method repeats for each slice of each data segment of the data object.

FIG. 16 is another flowchart illustrating another example of retrieving a data object. The method begins at step 292 where a processing module receives a retrieval request message (e.g., from a user device) from a requesting device. The retrieval request message may include one or more of a retrieval request command, a user ID, a data object name, a hash of the data object, a data size, a data type, a priority indicator, a security indicator, and a performance indicator. At step 294, the processing module determines read operational parameters, DS units, and slice names. Such a determination may be based on one or more of write operational parameters, a decompression algorithm, a decryption algorithm (e.g., Data Encryption Standard, Advanced Encryption Standard, a mathematical transformation, etc.), the user ID, the retrieval request, a vault lookup, a virtual DSN address to physical location table, converting the data object name to slice names (e.g., as discussed previously), a predetermination, a command, the data object name, the data size, the data type, the hash of the data object, the priority indicator, the security indicator, and the performance indicator.

At step 296, the processing module sends the DS units the slice names and a retrieve slice command. The DS units retrieve the EC data slices from memory and send the slices to the processing module in response to receiving the slice names and the retrieve slice command. At step 298, the processing module receives the EC data slices from the DS units. At step 300, the processing module de-slices and decodes the slices utilizing an error coding dispersal storage function and in accordance with the read operational parameters to produce a slice key reference and a compressed encrypted slice.

At step 302, the processing module retrieves a slice key based on the slice key reference. In an example, the processing module determines a virtual DSN address of where the slice key is stored by utilizing the slice key reference as an index into a slice key table. The processing module retrieves the slices of the slice key from the determined virtual DSN address of where the slice key is stored. The processing module de-slices and decodes the slices utilizing an error coding dispersal storage function and in accordance with the operational parameters in a vault for the slice keys and/or operational parameters retrieved from a user vault to produce the slice key.

At step 304, the processing module decompresses (e.g., expands) the compressed encrypted slice to produce the encrypted slice in accordance with the read operational parameters (e.g., the decompression algorithm). The processing module decrypts the encrypted slice utilizing the slice key and in accordance with the read operational parameters (e.g., the decryption algorithm) to produce the slice. In an example, the decryption algorithm is an addition mathematical transformation. In an instance, the processing module decrypts the encrypted slice by adding the slice key to the encrypted slice to produce the slice. Note that the addition result may be the same as the slice key when the slice key was previously determined to be equal to the slice (e.g., and the encrypted slice is zero).

At step 306, the processing module determines if all of the retrievable slices for all of the data segments have been recreated based on a data object size, a read threshold, and a size of the data segments produced so far. The method branches back to step 294 when the processing module determines that all of the slices for all of the data segments have not been recreated. The method continues to step 308 the processing module determines that all of the data segments have been recreated. At step 308, the processing module forms the data object from all of the produced data segments in accordance with the read operational parameters. The processing module sends the data object to the requesting device.

Figure 17:
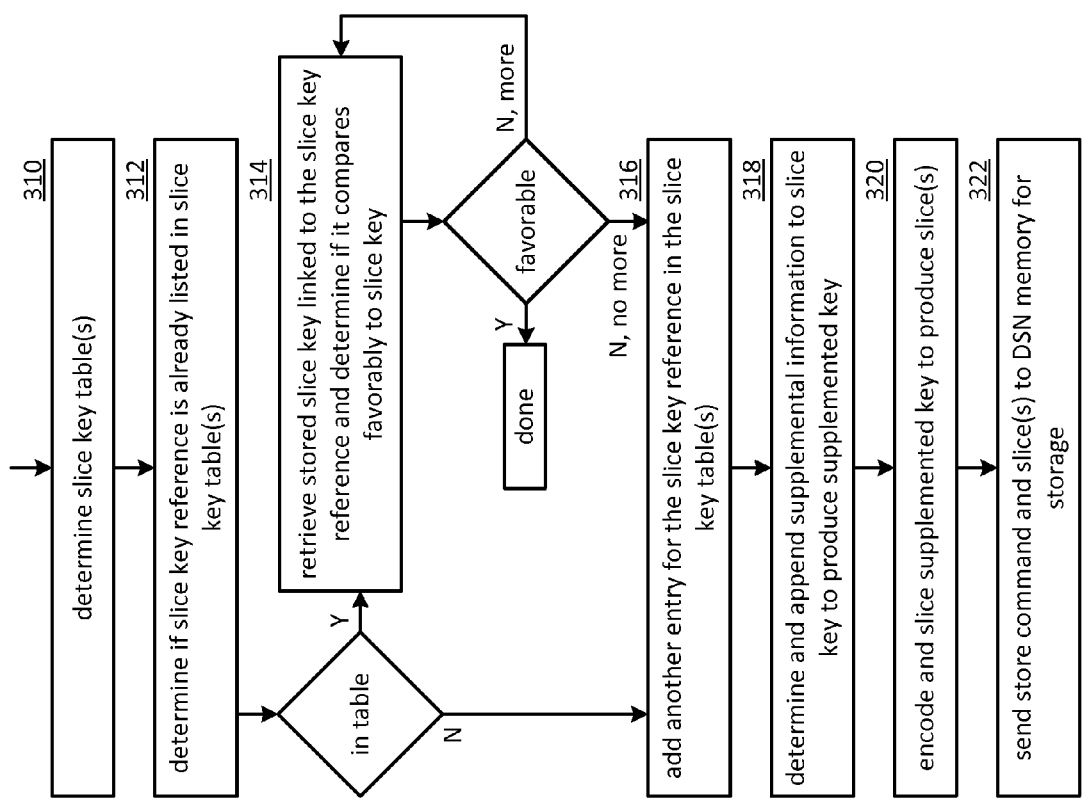
FIG. 17 is another flowchart illustrating another example of storing a key in accordance with the invention.

FIG. 17 is another flowchart illustrating another example of storing a key. The method begins with step 310 where a processing module determines a slice key table(s). Note that the slice key table may list previous slice keys and/or virtual DSN addresses of where previous slice keys are stored. Table entries may be indexed by a corresponding slice key reference. Such a determination may be based on one or more of a present slice, a present data segment, available slice key table(s), a user ID, a vault lookup, a predetermination, a command, the data object name, a data size, a data type, a hash of the data object, a priority indicator, a security indicator, and a performance indicator. In an example, the processing module determines the slice key tables to be tables affiliated with the present user ID and user vault.

At step 312, the processing module determines if the slice key reference (input to this method) is already substantially listed in the slice key tables. Note that a listing is an indicator that the corresponding slice key is stored in a dispersed storage network (DSN) memory. Such a determination may be based on one or more of comparing the slice key reference to the slice key reference entries in the slice key tables, a present slice, a present data segment, available slice key table(s), the user ID, the vault lookup, a predetermination, a command, a data object name, a data size, a data type, a hash of the data object, a priority indicator, a security indicator, and a performance indicator. In an example, the processing module determines that the slice key reference is already substantially listed in the slice key tables when the comparison of the slice key reference to a slice key reference entry in a slice key table indicates that they are the same. In another example, the processing module determines that the slice key reference is already substantially listed in the slice key tables when the comparison of the slice key reference to a slice key reference entry in a slice key table indicates that the difference is below a threshold (e.g., less than 3 bits difference). The method branches to step 316 when the processing module determines that the slice key reference is not already substantially listed in the slice key tables. The method continues to step 314 when the processing module determines that the slice key reference is already substantially listed in the slice key tables.

At step 314, the processing module retrieves a stored slice key linked to the slice key reference to produce a retrieved slice key. In an example, the processing module determines a virtual DSN address of where the slice key is stored by utilizing the slice key reference as an index into the slice key table. The processing module retrieves the slice(s) of the slice key from the determined virtual DSN address of where the slice key is stored. The processing module de-slices and decodes the slices utilizing an error coding dispersal storage function and in accordance with the operational parameters in a vault for the slice keys and/or operational parameters retrieved from a user vault to produce the retrieved slice key. Next, the processing module determines if the retrieved slice key compares favorably to the slice key to verify the key is appropriate. Such a determination may be based on one or more of comparing the retrieved slice key to the slice key, comparing the slice key reference to the slice key reference entry from the slice key table, the present slice, the present data segment, available slice key table(s), the user ID, the vault lookup, the predetermination, the command, the data object name, the data size, the data type, the hash of the data object, the priority indicator, the security indicator, and the performance indicator. In an example, the processing module determines that the retrieved slice key compares favorably to the slice key when the retrieved slice key is substantially the same as the slice key. In an instance, the processing module determines that the retrieved slice key compares favorably to the slice key when the comparison of the retrieved slice key to the slice key indicates that they are exactly the same and when a vault lookup indicates a strict standard of comparison. In another instance, the processing module determines that the retrieved slice key compares favorably to the slice key when the comparison of the retrieved slice key to the slice key indicates that the difference is below a threshold (e.g., less than 3 bits difference) and when a vault lookup indicates a relaxed standard of comparison and a threshold of 3 bits. The method ends when the processing module determines a favorable comparison (e.g., the slice key is already stored). The method branches repeats to step 314 when the comparison is unfavorable and there are more slice key tables to check. The method continues to step 316 when the processing module determines an unfavorable comparison and all of the slice key tables were checked.

The method continues at step 316 where the processing module adds another entry for the slice key reference in the slice key table(s). Note that the entry may include the slice key reference, the slice key, and/or a virtual DSN address of where the slice key will be stored. At step 318, the processing module determines and appends supplemental information to the slice key to produce a supplemented key. Such a determination may be based on one or more of the present slice, the present data segment, the user ID, the vault lookup, the pre-determination, the command, the data object name, the data size, the data type, the hash of the data object, the priority indicator, the security indicator, and the performance indicator. The supplemental information may include one or more of the user ID, the vault ID, the data object name, the data size, the data type, the hash of the data object, the priority indicator, the security indicator, and the performance indicator. For example, the processing module may determine to append the user ID and the data object name when the vault lookup indicates to append directory references.

At step 320, the processing module encodes and slices the supplemented key utilizing an error coding dispersal storage function and in accordance with the operational parameters in a vault for the slice keys and/or operational parameters retrieved from a user vault to produce slices. In an example, the encoder is a null encoder and the slicer is a null slicer such that one slice will be created that is equal to the supplemented key. At step 322, the processing module sends a store command and the slice(s) to the DSN memory for storage in accordance with the operational parameters in a vault for the slice keys and/or operational parameters retrieved from a user vault.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A computer implemented method comprises:
receiving, from a requesting device, a data storage request that includes data for storage;

determining whether substantially identical data is currently stored in a dispersed storage network (DSN) memory; and when the substantially identical data is not stored in the DSN memory:
  encoding at least a portion of the data using an error coding dispersal storage function to produce a set of encoded data slices;
  sending the set of encoded data slices to the DSN memory for storage therein; and
  generating a unique retrieval matrix for the requesting device, wherein the unique retrieval matrix identifies a sub-set of encoded data slices of the set of encoded data slices for subsequent retrieval of the at least a portion of the data; and when the substantially identical data is stored in the DSN memory:
  generating a second unique retrieval matrix for the requesting device, wherein the second unique retrieval matrix identifies a second sub-set of encoded data slices of the set of encoded data slices for subsequent retrieval of the at least a portion of the data.

2. The method of claim 1, wherein the determining whether the substantially identical data is currently stored in the DSN memory further comprises at least one of:
  determining whether a data identifier associated with the data substantially matches a data identifier associated with the substantially identical data;
  determining whether a calculated hash of the data substantially matches a stored hash of the substantially identical data; and
  comparing the data to the substantially identical data.

3. The method of claim 1, wherein generating the unique retrieval matrix further comprises at least one of:
  determining the unique retrieval matrix from a data identifier associated with the data;
  determining the unique retrieval matrix based on a group identification code that identifies a group of requesting devices, which includes the requesting device;
  determining the unique retrieval matrix based on an individual identification code of the requesting device; and
  determining the unique retrieval matrix based on a matrix generating function.

4. The method of claim 1, wherein the unique retrieval matrix comprises at least one of:
  a pillars list;
  a segmenting protocol;
  a pre-slice data manipulation function;
  a forward error correction encoding function;
  a slicing pillar width;
  a post-slice data manipulation function;
  a write threshold; and
  a read threshold.

5. The method of claim 1, wherein the unique retrieval matrix comprises one of:
  identity of a single unique sub-set of the encoded data slices, wherein a number of encoded data slices in the single unique sub-set of the encoded data slices is in a range including and between a read threshold of the error coding dispersal storage function and a pillar width of the error coding dispersal storage function; and
  identity of a group of unique sub-sets of the encoded data slices, wherein one of the group of unique sub-sets of the encoded data slices is selected to be used as the sub-set of encoded data slices.

6. The method of claim 1 further comprises at least one of:
  storing the unique retrieval matrix; and
  sending the unique retrieval matrix to the requesting device.

7. A computer implemented method comprises:
  receiving, from a requesting device, a read request for data stored as a plurality of sets of encoded data slices in a dispersed storage network (DSN) memory;
  obtaining a unique retrieval matrix based on an identity of the requesting device;
  identifying a sub-set of encoded data slices for a set of the plurality of sets of the encoded data slices based on the unique retrieval matrix; and
  when the sub-set of encoded data slices has been retrieved from the DSN memory:
    sending the sub-set of encoded data slices to the requesting device; or
    decoding the sub-set of the encoded data slices to produce a decoded data segment and sending the decoded data segment to the requesting device;
  when the sub-set of encoded data slices has not been retrieved from the DSN memory in a given time frame:
    identifying a second sub-set of encoded data slices for the set of the plurality of sets of the encoded data slices based on the unique retrieval matrix; and
  when the second sub-set of encoded data slices has been retrieved from the DSN memory:
    sending the second sub-set of encoded data slices to the requesting device; or
    decoding the second sub-set of the encoded data slices to produce the decoded data segment and sending the decoded data segment to the requesting device.

8. The method of claim 7, wherein the obtaining the unique retrieval matrix further comprises one of:
  receiving the unique retrieval matrix from the requesting device;
  retrieving the unique retrieval matrix from the DSN memory based on the identity of the requesting device; and
  generating the unique retrieval matrix based on one or more of:
    the identity of the requesting device;
    an error coding dispersal storage function;
    a data identifier;
    a unique retrieval matrix associated with at least one other requesting device of a plurality of requesting devices; and
    a unique retrieval matrix functionality indicator.

9. A computer comprises:
  an interface; and
  a processing module operable to:
    receive, from a requesting device via the interface, a data storage request that includes data for storage;
    determine whether substantially identical data is currently stored in a dispersed storage network (DSN) memory; and
    when the substantially identical data is not stored in the DSN memory:
      encode at least a portion of the data using an error coding dispersal storage function to produce a set of encoded data slices;
      send, via the interface, the set of encoded data slices to the DSN memory for storage therein; and
      generate a unique retrieval matrix for the requesting device, wherein the unique retrieval matrix identifies a sub-set of encoded data slices of the set of encoded data slices for subsequent retrieval of the at least a portion of the data and when the substantially identical data is stored in the DSN memory:
   generate a second unique retrieval matrix for the requesting device, wherein the second unique retrieval matrix identifies a second sub-set of encoded data slices of the set of encoded data slices for subsequent retrieval of the at least a portion of the data.

10. The computer of claim 9, wherein the processing module further functions to determine whether the substantially identical data is currently stored in the DSN memory by at least one of:
   determining whether a data identifier associated with the data substantially matches a data identifier associated with the substantially identical data;
   determining whether a calculated hash of the data substantially matches a stored hash of the substantially identical data; and
   comparing the data to the substantially identical data.

11. The computer of claim 9, wherein the processing module further functions to generate the unique retrieval matrix by at least one of:
   determining the unique retrieval matrix from a data identifier associated with the data;
   determining the unique retrieval matrix based on a group identification code that identifies a group of requesting devices, which includes the requesting device;
   determining the unique retrieval matrix based on an individual identification code of the requesting device; and
   determining the unique retrieval matrix based on a matrix generating function.

12. The computer of claim 9, wherein the unique retrieval matrix comprises at least one of:
   a pillars list;
   a segmenting protocol;
   a pre-slice data manipulation function;
   a forward error correction encoding function;
   a slicing pillar width;
   a post-slice data manipulation function;
   a write threshold; and
   a read threshold.

13. The computer of claim 9, wherein the unique retrieval matrix comprises one of:
   identity of a single unique sub-set of the encoded data slices, wherein a number of encoded data slices in the single unique sub-set of the encoded data slices is in a range including and between a read threshold of the error coding dispersal storage function and a pillar width of the error coding dispersal storage function; and
   identity of a group of unique sub-sets of the encoded data slices, wherein one of the group of unique sub-sets of the encoded data slices is selected to be used as the sub-set of encoded data slices.

14. The computer of claim 9, wherein the processing module further functions to perform at least one of:
   controlling storage of the unique retrieval matrix; and
   sending, via the interface, the unique retrieval matrix to the requesting device.

15. A computer comprises:
an interface; and
a processing module operable to:
   receive, from a requesting device via the interface, a read request for data stored as a plurality of sets of encoded data slices in a dispersed storage network (DSN) memory;
   obtain a unique retrieval matrix based on an identity of the requesting device;
   identify a sub-set of encoded data slices for a set of the plurality of sets of the encoded data slices based on the unique retrieval matrix; and
   when the sub-set of encoded data slices has been retrieved from the DSN memory:
      send, via the interface, the sub-set of encoded data slices to the requesting device;
      or decode the sub-set of the encoded data slices to produce a decoded data segment and send, via the interface, the decoded data segment to the requesting device
   when the sub-set of encoded data slices has not been retrieved from the DSN memory in a given time frame:
   identify a second sub-set of encoded data slices for the set of the plurality of sets of the encoded data slices based on the unique retrieval matrix; and
   when the second sub-set of encoded data slices has been retrieved from the DSN memory:
      send, via the interface, the second sub-set of encoded data slices to the requesting device; or
      decode the second sub-set of the encoded data slices to produce the decoded data segment and send, via the interface, the decoded data segment to the requesting device.

16. The computer of claim 15, wherein the processing module further functions to obtain the unique retrieval matrix by one of:
   receiving, via the interface, the unique retrieval matrix from the requesting device;
   retrieving, via the interface, the unique retrieval matrix from the DSN memory based on the identity of the requesting device; and
   generating the unique retrieval matrix based on one or more of:
      the identity of the requesting device;
      an error coding dispersal storage function;
      a data identifier;
      a unique retrieval matrix associated with at least one other requesting device of a plurality of requesting devices; and
      a unique retrieval matrix functionality indicator.

* * * * *